United States Patent
Son et al.

(10) Patent No.: US 9,922,179 B2
(45) Date of Patent: Mar. 20, 2018

(54) METHOD AND APPARATUS FOR USER AUTHENTICATION

(71) Applicant: Samsung Electronics Co., Ltd., Gyeonggi-do (KR)

(72) Inventors: Dong Il Son, Gyeonggi-do (KR); Jong Chul Choi, Gyeonggi-do (KR); Yang Wook Kim, Gyeonggi-do (KR); Chi Hyun Cho, Gyeonggi-do (KR); Pil Kyoo Han, Gyeonggi-do (KR); Chang Ryong Heo, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 14/719,512

(22) Filed: May 22, 2015

(65) Prior Publication Data

US 2015/0339468 A1 Nov. 26, 2015

(30) Foreign Application Priority Data

May 23, 2014 (KR) .......................... 10-2014-0062468

(51) Int. Cl.
*G06F 21/31* (2013.01)
*G06F 3/01* (2006.01)
*G06F 21/36* (2013.01)
*G06F 1/16* (2006.01)
*G06F 3/0484* (2013.01)

(52) U.S. Cl.
CPC .............. *G06F 21/31* (2013.01); *G06F 1/163* (2013.01); *G06F 3/011* (2013.01); *G06F 3/012* (2013.01); *G06F 3/013* (2013.01); *G06F 3/017* (2013.01); *G06F 3/04842* (2013.01); *G06F 21/36* (2013.01)

(58) Field of Classification Search
CPC ........... G06F 3/017; G06F 3/011; G06F 21/31
See application file for complete search history.

(56) References Cited

U.S. PATENT DOCUMENTS

| 5,806,072 A * | 9/1998 | Kuba .................... H04N 1/2112 |
| 6,084,556 A * | 7/2000 | Zwern ................. G09B 21/008 345/158 |
| 6,600,480 B2 * | 7/2003 | Natoli ..................... G06F 3/014 345/156 |
| 7,337,410 B2 * | 2/2008 | Lin ........................ G06F 3/011 700/17 |
| 8,532,675 B1 * | 9/2013 | Pasquero .......... H04M 1/72572 345/158 |

(Continued)

FOREIGN PATENT DOCUMENTS

| KR | 10-2013-0025325 A | 3/2013 |
| KR | 10-2013-0027774 A | 3/2013 |
| KR | 10-2013-0123261 A | 11/2013 |

*Primary Examiner* — James R Turchen
(74) *Attorney, Agent, or Firm* — Cha & Reiter, LLC

(57) ABSTRACT

A method is provided including: detecting, by an electronic device, at least one signal that is generated while a predetermined content is displayed on a display; identifying a security-related object associated with the content based on the signal; comparing, by the electronic device, information relating to the object with specified security setting information; and releasing a restriction on access to a resource based on an outcome of the comparison.

13 Claims, 14 Drawing Sheets

(56) References Cited

U.S. PATENT DOCUMENTS

| | | | | |
|---|---|---|---|---|
| 8,957,835 | B2* | 2/2015 | Hoellwarth | G02B 27/017 345/8 |
| 9,348,420 | B2* | 5/2016 | Walline | G06F 3/017 |
| 2002/0113820 | A1* | 8/2002 | Robinson | G06F 17/30873 715/764 |
| 2005/0264527 | A1* | 12/2005 | Lin | G06F 3/011 345/156 |
| 2011/0162066 | A1* | 6/2011 | Kim | G06F 3/017 726/18 |
| 2013/0063380 | A1 | 3/2013 | Wang et al. | |
| 2013/0196757 | A1* | 8/2013 | Latta | A63F 13/211 463/31 |
| 2013/0298079 | A1* | 11/2013 | Kim | G06F 3/04883 715/810 |
| 2013/0314303 | A1* | 11/2013 | Osterhout | G06F 3/005 345/8 |
| 2013/0335573 | A1* | 12/2013 | Forutanpour | G06F 3/011 348/158 |
| 2014/0125574 | A1* | 5/2014 | Scavezze | G06F 21/31 345/156 |
| 2014/0282973 | A1* | 9/2014 | Langley | H04L 63/08 726/7 |
| 2014/0306866 | A1* | 10/2014 | Miller | G06T 19/006 345/8 |
| 2015/0138065 | A1* | 5/2015 | Alfieri | G06F 3/017 345/156 |
| 2015/0331485 | A1* | 11/2015 | Wilairat | G02B 27/0172 345/156 |
| 2015/0365236 | A1* | 12/2015 | Kim | G06F 3/017 726/18 |
| 2016/0162679 | A1* | 6/2016 | Lin | G06F 21/36 726/28 |

\* cited by examiner

METHOD AND APPARATUS FOR USER AUTHENTICATION

CLAIM OF PRIORITY

This application claims the benefit under 35 U.S.C. § 119(a) of a Korean patent application filed on May 23, 2014 in the Korean Intellectual Property Office and assigned Serial number 10-2014-0062468, the entire disclosure of which is hereby incorporated by reference.

TECHNICAL FIELD

The present disclosure relates to computer security and more particularly to a method and apparatus for security authentication.

BACKGROUND

With the recent development of digital technology, electronic devices available for communication and personal information processing while moving, for example, mobile communication devices, personal digital assistants (PDAs), electronic organizers, smartphones, and tablet personal computers (PCs), are released variously. Such electronic devices support a lock setting relating to a management.

Typical electronic devices support a function for outputting a lock screen relating to a lock setting and a function for releasing a lock set in correspondence to input information with respect to a display. Moreover, recent electronic devices are capable of providing contents relating to virtual reality. Accordingly, users may use various contents in virtual reality on the basis of electronic devices. Such typical electronic devices provide virtual reality contents without choosing users.

SUMMARY

According to embodiments of the disclosure, method is provided comprising: detecting, by an electronic device, at least one signal that is generated while a predetermined content is displayed on a display; identifying a security-related object associated with the content based on the signal; comparing, by the electronic device, information relating to the object with specified security setting information; and releasing a restriction on access to a resource based on an outcome of the comparison.

According to embodiments of the disclosure, an electronic device is provided comprising: a display configured to output a predetermined content; and a processor configured to identify a security-related object that is associated with the content based on signal that is generated while the content is on display, compare information relating to the object with specified security setting information, and release a restriction on access to a resource based on an outcome of the comparison.

DETAILED DESCRIPTION

Figure 1:
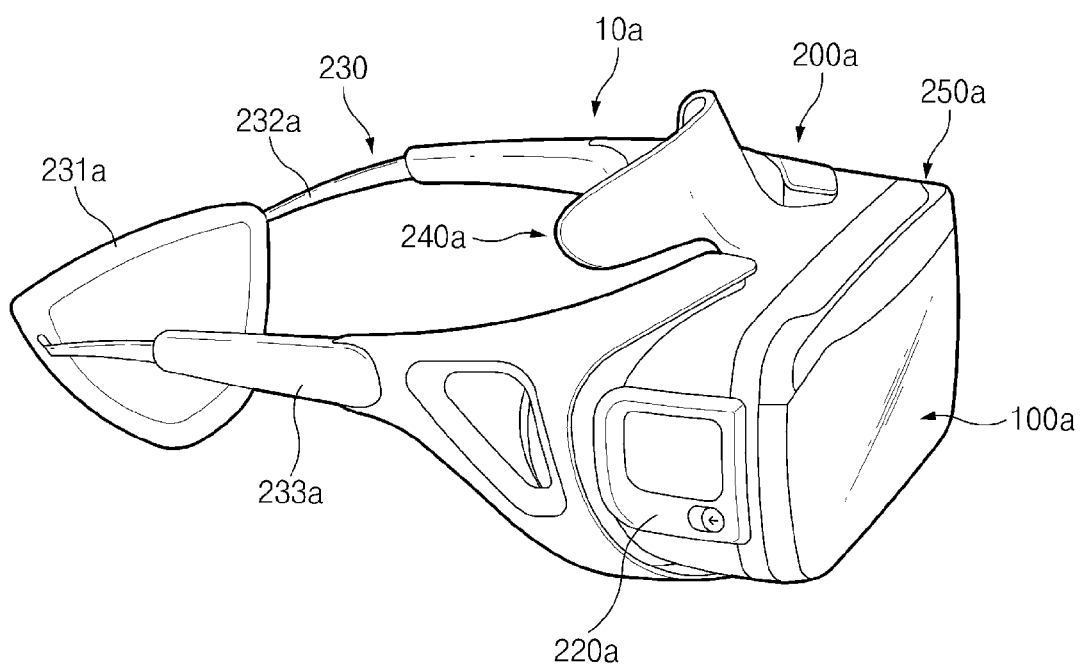
FIG. 1 is a diagram of an example of a virtual reality (VR) supporting system according to various embodiments of the present disclosure.

Hereinafter, various embodiments of the present disclosure are disclosed with reference to the accompanying drawings. Various modifications are possible in various embodiments of the present disclosure and specific embodiments are illustrated in drawings and related detailed descriptions are listed. However, this does not limit various embodiments of the present disclosure to a specific embodiment and it should be understood that the present disclosure covers all the modifications, equivalents, and/or replacements of this disclosure provided they come within the scope of the appended claims and their equivalents. With respect to the descriptions of the drawings, like reference numerals refer to like elements.

The term "include", "comprise", and "have", or "may include", or "may comprise" and "may have" used herein indicates disclosed functions, operations, or existence of elements but does not exclude other functions, operations or elements. Additionally, in various embodiments of the present disclosure, the term "include", "comprise", "including", or "comprising", specifies a property, a region, a fixed number, a step, a process, an element and/or a component but does not exclude other properties, regions, fixed numbers, steps, processes, elements and/or components.

In various embodiments of the present disclosure, expression "A or B" or "at least one of A or/and B" may include all possible combinations of items listed together. For instance, the expression "A or B", or "at least one of A or/and B" may indicate include A, B, or both A and B.

The terms such as "1st", "2nd", "first", "second", and the like used herein may refer to modifying various different elements of various embodiments of the present disclosure, but do not limit the elements. For instance, such expressions do not limit the order and/or importance of corresponding components. The expressions may be used to distinguish one element from another element. For instance, both "a first user device" and "a second user device" indicate a user device but indicate different user devices from each other. For example, a first component may be referred to as a second component and vice versa without departing from the scope of the present disclosure.

In this disclosure, when one part (or element, device, etc.) is referred to as being "connected" to another part (or element, device, etc.), it should be understood that the former can be "directly connected" to the latter, or "connected" to the latter via an intervening part (or element, device, etc.). In contrast, when an element is referred to as being "directly connected" or "directly coupled" to another element, there are no intervening elements present. In various embodiments of the present disclosure, terms used in this specification are used to describe specific embodiments, and are not intended to limit the scope of the present disclosure. The terms of a singular form may include plural forms unless they have a clearly different meaning in the context.

Unless otherwise indicated herein, all the terms used herein, which include technical or scientific terms, may have the same meaning that is generally understood by a person skilled in the art. In general, the terms defined in the dictionary should be considered to have the same meaning as the contextual meaning of the related art, and, unless clearly defined herein, should not be understood abnormally or as having an excessively formal meaning.

Additionally, an electronic device according to various embodiments of the present disclosure may be a device with an image processing function. For instance, electronic devices may include at least one of smartphones, tablet personal computers (PCs), mobile phones, video phones, electronic book (e-book) readers, desktop personal computers (PCs), laptop personal computers (PCs), netbook computers, personal digital assistants (PDAs), portable multimedia player (PMPs), MP3 players, mobile medical devices, cameras, and wearable devices (for example, head-mounted-devices (HMDs) such as electronic glasses, electronic apparel, electronic bracelets, electronic necklaces, electronic appcessories, electronic tattoos, and smart watches).

According to some embodiments of the present disclosure, an electronic device may be smart home appliances having an image processing function. The smart home appliances may include at least one of, for example, televisions, digital video disk (DVD) players, audios, refrigerators, air conditioners, cleaners, ovens, microwave ovens, washing machines, air cleaners, set-top boxes, TV boxes (for example, SAMSUNG HOMESYNC™, APPLE TV™ or GOOGLE TV™), game consoles, electronic dictionaries, electronic keys, camcorders, and electronic picture frames.

According to some embodiments of the present disclosure, an electronic device may include at least one of various medical devices (for example, magnetic resonance angiography (MRA) devices, magnetic resonance imaging (MRI) devices, computed tomography (CT) devices, medical imaging devices, ultrasonic devices, etc.), navigation devices, global positioning system (GPS) receivers, event data recorders (EDRs), flight data recorders (FDRs), vehicle infotainment devices, marine electronic equipment (for example, marine navigation systems, gyro compasses, etc.), avionics, security equipment, vehicle head modules, industrial or household robots, financial institutions' automatic teller machines (ATMs), and stores' point of sales (POS). According to some embodiments of the present disclosure, an electronic device may include at least one of furniture or buildings/structures having an image processing function, electronic boards, electronic signature receiving devices, projectors, and various measuring instruments (for example, water, electricity, gas, or radio signal measuring instruments). An electronic device according to various embodiments of the present disclosure may be one of the above-mentioned various devices or a combination thereof. Additionally, an electronic device according to various embodiments of the present disclosure may be a flexible device. Furthermore, it is apparent to those skilled in the art that an electronic device according to various embodiments of the present disclosure is not limited to the above-mentioned devices.

Hereinafter, an electronic device according to various embodiments of the present disclosure will be described in more detail with reference to the accompanying drawings. The term "user" in various embodiments may refer to a person using an electronic device or a device using an electronic device (for example, an artificial intelligent electronic device).

FIG. 1 is a diagram of an example of a virtual reality supporting system according to various embodiments of the present disclosure.

Referring to FIG. 1, a specific type virtual reality supporting system 10a according to an embodiment of the present disclosure may include a mounting frame 200a and an electronic device 100a.

The mounting frame 200a may be prepared to allow a user to wear the virtual reality supporting system 10a on a specific part (for example, the head, the neck, and the shoulder) of a body. In relation to this, the mounting frame 200a may include a fixing part 230a and a mounting part 250a. Additionally or alternatively, the mounting frame 200a may include an input device 220a.

The fixing part 230a may have a predetermined frame to allow at least a portion of the inside to face a user's body. The fixing part 230a may include a pad part 231a disposed at the user's head back and two lead parts 232a and 233a connected to the pad part 231a. The pad part 231a may have a predetermined surface and may be disposed to contact the user's head back. The two lead parts 232a and 233a may have one sides respectively connected to both edges of the pad part 231a and the other sides respectively fixed at both edges of the mounting part 250a. The two lead parts 232a and 233a may be prepared to allow length adjustment. As the mounting part 250a is prepared to have a predetermined volume, the two lead parts 232a and 233a may be fixed at the upper and lower ends at both edges of the mounting part 250a.

The mounting part 250a may be fixedly connected to the lead parts 232a and 233a prepared at the fixing parts 230a. A support part 240a contacting a user's body part, for example, the forehead, may be provided at one side of the mounting part 250a. Herein, the support part 240a may be prepared as the appearance case of the mounting part 250a is transformed. The input device 220a may be displayed at one side, for example, a side part, of the mounting part 250a. The electronic device 100a may be coupled to the front of the mounting part 250a. Although it is shown in the drawing that the electronic device 100a is completely coupled to the mounting part 250a, the mounting part 250a may be prepared to allow the electronic device 100a to be detachable. At least one lens and a barrel where lenses are disposed may be prepared in the mounting part 250a. An interval of at least one lens may vary depending on a magnification. Accordingly, the mounting part 250a provides a support for expanding the screen of the electronic device 100a disposed at the front to be seen by a user.

At least one input device 220a may be disposed at one side of the mounting part 250a and may be electrically connected to the electronic device 100a. According to various embodiments of the present disclosure, at least one input device 220a may be prepared at one side of the fixing part 230a. The input device 220a may be prepared with at least one of a touch type (for example, a touch screen and a touch pad) and a button type (for example, a physical key, a start key, and a power key). According to various embodiments of the present disclosure, a sensor module may be further disposed at one side of the mounting part 250a where the input device 220a is disposed. The input device 220a may generate an event in response to a contact of a user's finger and may deliver the generated event to the electronic device 100a. When the input device 220a is prepared in plurality, each may include unique ID information. Accordingly, signals generated by the plurality of input devices 220a may be identified by the electronic device 100a.

When security related contents are outputted to the display of the electronic device 100a, the virtual reality supporting system 10a having the above structure according to various embodiments of the present disclosure may check the security related contents through the mounting frame 200a. At this point, the virtual reality supporting system 10a may support the release of a restriction on access to a resource in correspondence to a signal generated from at least one of the input device 220a and a sensor module prepared at the mounting frame 200a or at least one of the input/output interface and a sensor module prepared in the electronic device 100a. When release of a restriction occurs, the virtual reality supporting system 10a may support execution of specific resources.

Figure 2:
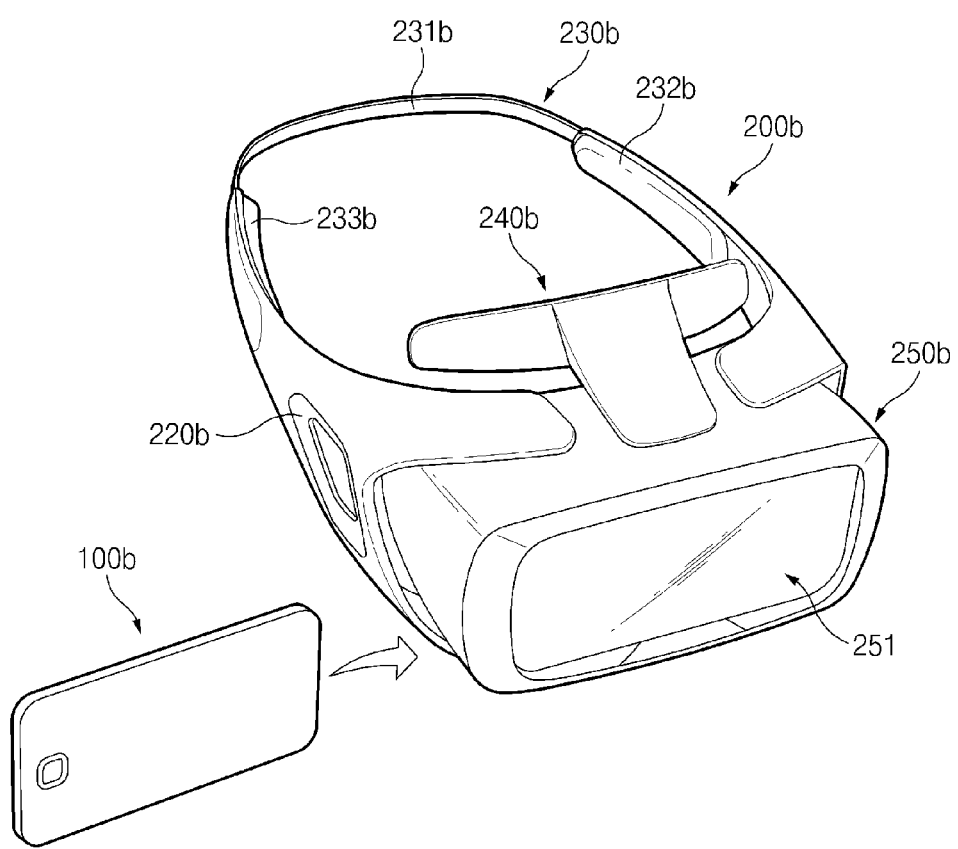
FIG. 2 is diagram of an example of a VR supporting system according to various embodiments of the present disclosure.

FIG. 2 is a diagram of an example of a virtual reality supporting system according to various embodiments of the present disclosure.

Referring to FIG. 2, according to an embodiment of the present disclosure, another type of a virtual reality supporting system 10b may include a mounting frame 200b and an electronic device 100b.

The mounting frame 200b may be prepared to allow a user to wear the virtual reality supporting system 10b on a specific place (for example, the head) of a body. In relation to this, the mounting frame 200b may include a fixing part 230a and a mounting part 250b. According to an embodiment, the mounting frame 200b may include an input device 200b.

The fixing part 230b may have a predetermined frame to allow at least a portion thereof to face a user's body.

According to an embodiment of the present disclosure, the fixing part 230b may include a line part 231b disposed at a user's head back and two support parts 232b and 233b connected to the line part 231b. The line part 231b may be disposed at a user's body portion, for example, the back of the head. The line part 231b may be prepared to allow length adjustment by using the two support parts 232b and 233b as an axis. The two support parts 232b and 233b may be respectively connected to both side edges of the line part 231b or each may be fixedly connected to a case of the mounting part 250b. The two support parts 232b and 233b may be prepared with at least an empty portion of the inside thereof so as to support the length adjustment of the line part 231b. The input device 220b may be disposed at least one of the two support parts 232b and 233b.

The mounting part 250b may be fixedly connected to the lead parts 232b and 233b prepared at the fixing parts 230b. A support part 240b facing a user's body part, for example, the forehead, may be provided at one side of the mounting part 250b. Herein, the support part 240b may be prepared as the appearance case of the mounting part 250b is transformed. Alternatively, as shown in the drawing, the support part 240b may be separately prepared and may be fixedly disposed at one side of the appearance case of the mounting part 250b. The support part 240b may be detachably prepared according to a modification of a design method. A seating part 251 may be disposed at the front of the mounting part 250b to allow the electronic device 100b to be detachable. The seating part 251 may have a size corresponding to the size of the electronic device 100b.

According to various embodiments of the present disclosure, an insertable part where the electronic device 100b is insertable may be prepared at one side of the seating part 251. A jack connectable with a connector of the electronic device 100b may be disposed at one side of the seating part 251. As the electronic device 100b is seated at the seating part, the connector of the electronic device 100b and the jack may be electrically connected to each other. The jack may serve as a communication interface role for transmitting an input signal of the input device 220b to the electronic device 100b. The communication interface prepared at the seating part 251 may be replaced with a wireless communication interface between the mounting frame 200b and the electronic device 100b. At least a portion of the mounting part 250b may be prepared with an elastic material, for example, silicon. For example, an area contacting a user's eye portion in the mounting part 250b may be prepared with an elastic material. At least one lens and a barrel where lenses are disposed may be prepared in the mounting part 250b. An interval of at least one lens may vary depending on a magnification. Accordingly, the mounting part 250b provides a support for expanding the screen of the electronic device 100b disposed at the front seating part 251 to be seen by a user.

The input device 220b may be disposed at least one of the support parts 232b and 233b and may be electrically connected to the electronic device 100b. According to various embodiments of the present disclosure, the input device 220b may be prepared at one side of the mounting part 250b. The input device 220b may be prepared with at least one of a touch type (for example, a touch screen and a touch pad) and a button type (for example, a physical key, a start key, and a power key). According to various embodiments of the present disclosure, a sensor module may be further disposed at one side of the support parts 232b and 233b where the input device 220b is disposed. Alternatively, the input device 220b may include at least one sensor. The input device 220b may generate an event in response to a contact of a user's finger and may deliver the generated event to the electronic device 100b.

When security related contents are outputted to the display of the electronic device 100b, the virtual reality supporting system 10b having the above structure according to various embodiments of the present disclosure may check the security related contents through the mounting frame 200b. At this point, the virtual reality supporting system 10a may support the release of a restriction on access to a resource in correspondence to a signal generated from at least one of the input device 220b and a sensor module prepared at the mounting frame 200b or at least one of the input/output interface and a sensor module prepared in the electronic device 100b. When release of a restriction occurs, the virtual reality supporting system 10a may support execution of specific resources. The above-mentioned virtual reality supporting system 10a or virtual reality supporting system 10b may be prepared in various forms according to a design method. Accordingly, the mounting frame 200a and the mounting frame 200b are described as a mounting frame 200 and the electronic device 100a and the electronic device 100b are described as an electronic device 100.

Figure 3:
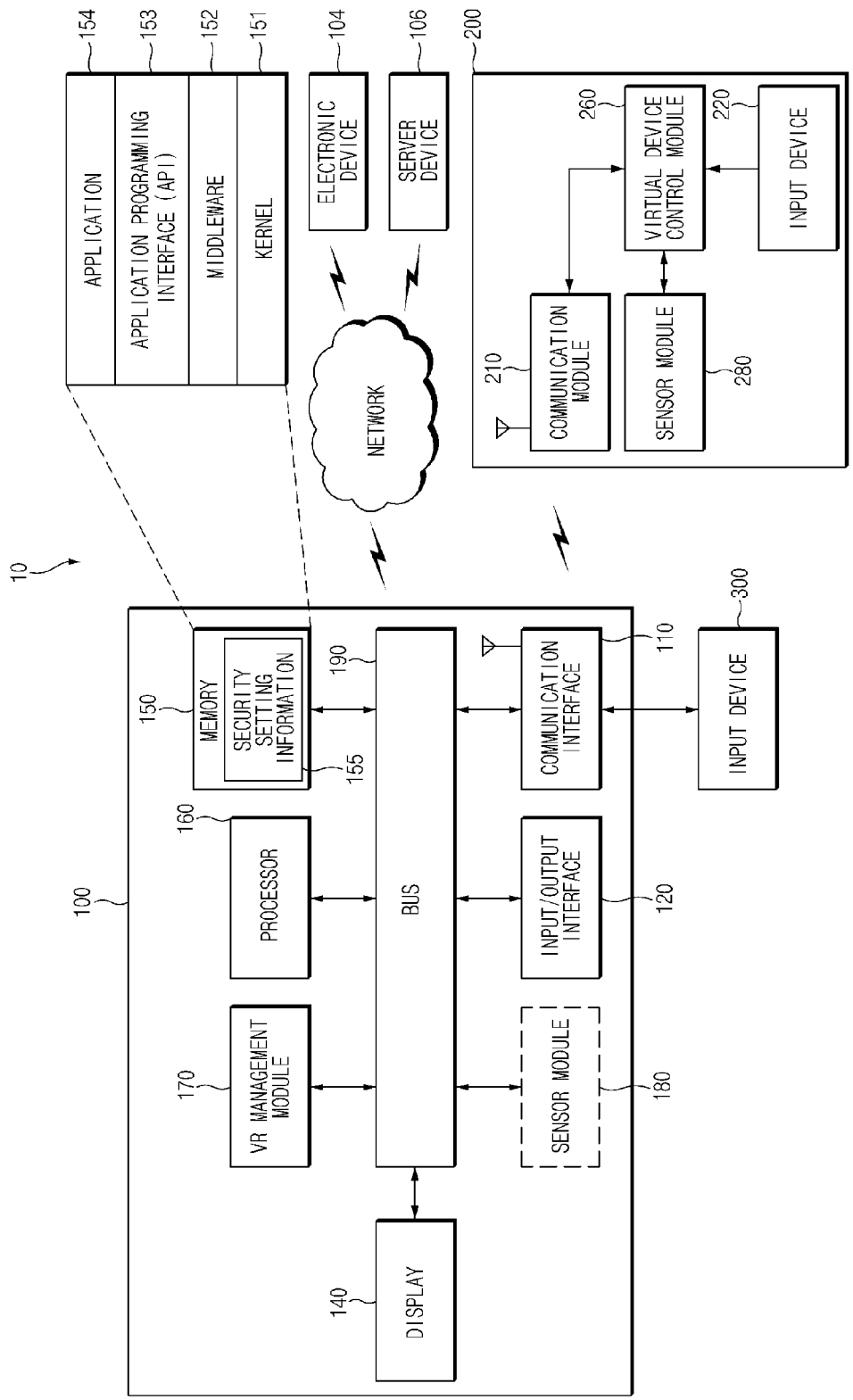
FIG. 3 is a block diagram of an example of a VR supporting system according to various embodiments of the present disclosure.

FIG. 3 is a block diagram of an example of a virtual reality supporting system according to various embodiments of the present disclosure.

Referring to FIG. 3, a virtual reality supporting system 10 may include a mounting frame 200 and an electronic device 100 and According to an embodiment may further include an input device 300. According to an embodiment, the virtual reality supporting system 10 may further include a network 162, an external electronic device 104, and a server device 106.

In relation to the mounting frame 200, as described above, at least one lens may be disposed at the inside of an appearance case at a predetermined interval and the electronic device 100 may be disposed or seated at the front. An image outputted to the display 140 of the electronic device 100 may be provided through one side of the mounting frame 200. Such a mounting frame 200 may According to an embodiment include a communication module 210, a sensor module 280, an input device 220, and a mounting frame control module 260.

The communication module 210 may establish a communication channel with the electronic device 100. For example, the communication module 210 may include a short range communication module (for example, a Bluetooth communication module, a wireless fidelity (WiFi) Direct communication module, a ZigBee communication module, etc.) and may establish a short range communication channel with the electronic device 100. Alternatively, the communication module 210 may include a wired communication interface and may establish a wired communication channel with the electronic device 100. According to various embodiments of the present disclosure, the communication module 210 may transmit an input event generated by the input device 220 to the electronic device 100. Alternatively, the communication module 210 may transmit a sensor signal generated by the sensor module 280 to the electronic device 100. According to an embodiment of the present disclosure, when the electronic device 100 is mounted at the mounting frame 200, the communication module 210 may be activated automatically. When the electronic device 100 is dismounted from the mounting frame 200, the communication module 210 may be deactivated automatically. According to various embodiments of the present disclosure, the communication module 210 may be controlled to be turned on or turned off in correspondence to an input event generated by the input device 220.

The sensor module 280 may include at least one sensor. For example, the sensor module 280 may include a gyro sensor, an acceleration sensor, and a geomagnetic sensor. The sensor module 280 may generate a sensor signal corresponding to a movement of the mounting frame 200 and may deliver this to the communication module 210. The sensor module 280 may be activated in correspondence to at least one of the case that the electronic device 100 is mounted at the mounting frame 200 and the case that an input event occurring from the input device 220. The sensor module 280 may be deactivated in correspondence to at least one of the case that the electronic device 100 is dismounted from the mounting frame 200 and the case that an input event occurring from the input device 220.

The input device 220 may generate at least one input event relating to a device control of the mounting frame 200 in correspondence to a user control. In relation to this, at least one input device 220 may be disposed at a predetermined position, for example, at least one side of mounting parts, of the mounting frame 200. According to an embodiment of the present disclosure, the input device 220 may include at least one physical key button. At least one physical key may include a power key for controlling the turn-on or turn-off of the mounting frame 200, a numeric input available key button, and a direction control related direction key. According to an embodiment of the present disclosure, the input device 220 may include at least one touch pad. A touch event generated from a touch pad may be provided to the electronic device 100 through the communication module 210. The touch event may include a tap event tapping a touch pad, an event corresponding to touching down a specific point of a touch pad, and a drag event corresponding to a drag operation on a touch pad. According to various embodiments of the present disclosure, a touch pad form of the input device may support a hovering event occurrence. The touch pad may support a touch event occurrence by various touch means (for example, an electronic pen) in addition to a user's finger.

According to various embodiments of the present disclosure, the input device 220 may generate an input event relating to a screen control outputted to the display 140 of the electronic device 100. For example, the input device 220 may generate an event relating to a movement control of a virtual view pointer outputted to the display 140 of the electronic device 100 and an event selecting a specific area that a virtual view pointer indicates. Alternatively, the input device 220 may generate an event relating to a control such as moving, copying or removing the contents outputted to the display 140. According to various embodiments of the present disclosure, the input device 220 may generate an initialization event relating to the release of a restriction. The input device 220 may generate an event relating to restriction release information input. The input device 220 may generate an event relating to contents search provided after the restriction is released.

The mounting frame control module 260 may perform a device control of the mounting frame 200. For example, the mounting frame control module 260 may perform an initialization of the mounting frame 200 in correspondence to an input event occurring from the input device 220 or the mounting of the electronic device 100. During this operation, the mounting frame control module 260 may establish a communication channel with the electronic device 100 by controlling the communication module 210. The mounting frame control module 260 may deliver to the electronic device 100 at least one of an input event or a sensor signal occurring from at least one of the input device 220 and the sensor module 280.

The input device 300 may be connected through the communication interface 110 of the electronic device 100. The input device 300 may be detachably prepared to the electronic device 100. The input device 300 may support a security related contents output control or security related input event generation of the electronic device 100. For example, the input device 300 may support an input event generation applied to corresponding contents when specific contents are outputted to the display 140 of the electronic device 100. According to an embodiment of the present disclosure, the input device 300 may include a start key button and a numeric key button.

An input event corresponding to a start key button selection occurring from the input device 300 may be used for the security related contents output or restriction release information input initialization of the electronic device 100. An input event corresponding to a numeric key button selection occurring from the input device 300 may be used to release a particular restriction. The input device 300 may include at least one of a touch screen and a touch pad. According to various embodiments of the present disclosure, the input device 300 may be a remote control device including a navigation key. A direction control event occurring from the input device 300 may serve as an event for moving or selecting at least one virtual view pointer displayed on the display 140 of the electronic device 100. Alternatively, the direction control event may be used for at least one operation of indicating (or pointing out), selecting, executing, moving, copying, and removing at least one content displayed on the display 140.

The electronic device 104 may directly establish a communication channel with a communication interface 110 of the electronic device 100. Alternatively, the electronic device 104 may establish a communication channel with the electronic device 100 through the network 162. For example, the electronic device 104 may include a cellular communication module and may establish a mobile communication channel with the electronic device 100. Alternatively, the electronic device 104 may include a WiFi communication module and may establish a mobile communication channel with the electronic device 100. The electronic device 104 may provide content to the electronic device 100 by using the established communication channel. For example, the electronic device 104 may provide security related contents to the electronic device 100. The security related contents may be contents relating to security setting and restriction release. According to various embodiments of the present disclosure, the electronic device 104 may deliver restriction release information to the electronic device 100 in correspondence to a request of the electronic device 100. The restriction release information that the electronic device 104 delivers may be used as information for releasing a restriction on access to a resource of the electronic device the electronic device 100. According to an embodiment of the present disclosure, while the virtual reality based security related contents of the electronic device 100 are outputted, the electronic device 104 may provide restriction release information to the electronic device 100. When the transmitted restriction release information is invalid information, the electronic device 104 may receive feedback information corresponding thereto.

The network 162 may establish a communication channel between the electronic device 100 and the electronic device 104. The network 162, for example, may include network device components relating to a mobile communication channel establishment. Alternatively, the network 162 may include network device components relating to an internet communication channel establishment. The network 162 may transmit a restriction release information input request of the electronic device 100 to the electronic device 100. The network 162 may transmit the restriction release information of the electronic device 104 to the electronic device 100. The network 162 may transmit an authentication result of the delivered restriction release information to the electronic device 104.

Referring to FIG. 3, the electronic device 100 may include a communication interface 110, an input/output interface 120, a bus 190, a display 140, a memory 150, a processor 160, and a virtual reality (VR) management module 170. According to an embodiment, the electronic device 100 may further include a sensor module 180. According to an embodiment, the electronic device 100 may further include at least one camera module. The camera module may collect images in relation to virtual reality or augmented reality support.

The electronic device 100 of the above-mentioned configuration may output security related contents to the display 140 according to a control of the VR management module 170. The electronic device 100 may release an active restriction on access to a resource based on restriction release information delivered through at least one of the communication interface 110, the input/output interface 120, and the sensor module 180. When the restriction is released, the electronic device 100 removes the output of the security related contents and outputs virtual reality or augmented reality related contents to the display 140. According to various embodiments of the present disclosure, the electronic device 100 outputs security related contents to the display 140 in a state of being mounted at the mounting frame 200, and support a restriction release in correspondence to at least one event of an input event that the mounting frame 200 provides through the communication interface 110 and a sensor event that the sensor module 180 provides.

The communication interface 110 may connect a communication between the electronic device 100 and an external device (for example, at least one of the mounting frame 200, the input device 300, the electronic device 104, and the server device 106). For example, the communication interface 110 may communicate with the external device in connection to the network 162 through wireless communication or wired communication. The wireless communication, for example, may include at least one of WiFi, Bluetooth (BT), near field communication (NFC), global positioning system (GPS), and cellular communication (for example, LTE, LTE-A, CDMA, WCDMA, UMTS, WiBro, or GSM). The wired communication may include at least one of universal serial bus (USB), high definition multimedia interface (HDMI), recommended standard 232 (RS-232), and plain old telephone service (POTS), for example.

According to an embodiment of the present disclosure, the network 162 may be telecommunications network. The telecommunications network may include at least one of computer network, internet, internet of things, and telephone network. According to an embodiment of the present disclosure, a protocol (for example, transport layer protocol, data link layer protocol, or physical layer protocol) for communication between the electronic device 100 and an external device may be supported by at least one of the application 154, the application programming interface 153, the middleware 152, the kernel 151, and the communication interface 110.

The communication interface 110 may include a plurality of communication modules when the electronic device 100 supports a plurality of communication methods. For example, the electronic device 100 may include a communication module capable of establishing a direct communication channel, for example, a short range communication module or a direct communication module, with at least one of the mounting frame 200, the input device 300, and the electronic device 104. The short range communication module or the direct communication module may include at least one of various communication modules such as a WiFi direct communication module, a Bluetooth communication module, and a Zigbee communication module. Alternatively, the direct communication module may include a wired communication module such as cable.

According to an embodiment of the present disclosure, the communication interface 110 may receive at least one of security related contents or restriction release information from at least one of the electronic devices 104 and the server device 106. The communication interface 110 may deliver the received security related contents or restriction release information to the VR management module 170. According to an embodiment of the present disclosure, the communication interface 110 may transmit feedback information on whether a restriction is released or not to at least one of the electronic devices 104 and the server device 106 in correspondence to a control of the VR management module 170.

The input/output interface 120 may deliver an instruction or data inputted from a user through an input/output device (for example, a sensor, a keyboard, or a touch screen) to the processor 120, the memory 150, the communication interface 160, or the VR management module 170 through the bus 190. For example, the input/output interface 120 may provide data on a user's touch inputted through a touch screen to the processor 160. According to an embodiment, the input/output interface 120 may output, through the input/output device (for example, a speaker or a display), instructions or data received from the processor 120, the memory 150, the communication interface 110, or the VR management module 170 through the bus 190. For example, the input/output interface 120 may output audio data included in security related contents through a speaker according to a control of the VR management module 170. Alternatively, the input/output interface 120 may output audio data included in virtual reality contents or augmented reality contents processed by the VR management module 170 through a speaker.

According to various embodiments of the present disclosure, the input/output interface 120 may include a physical key button (for example, a home key, a side key, and a power key), a jog key, and a keypad. The input/output interface 120 may include a virtual keypad outputted to the display 140 as an input device. The input/output interface 120 may generate an input signal relating to contents (for example, at least one of security related contents, virtual reality contents, and augmented reality contents) output or output stop, or termination in correspondence to a user control.

According to various embodiments of the present disclosure, the input/output interface 120 may perform an audio processing related function. In relation to this, the input/output interface 120 may include one or more of at least one of a speaker and a microphone. The input/output interface 120, for example, may perform a guide sound or sound effect output set in input information inputted while security related contents are outputted. The input/output interface 120 may output a guide sound or sound effect for guiding whether a restriction is released. The guide sound or sound effect output of the input/output interface 120 may be omitted in correspondence to a user setting or whether it is supported by the electronic device 100.

The bus 190 may be a circuit connecting the above-mentioned components and delivering a communication (for example, a control message) between the above-mentioned components. For example, the bus 190 may deliver an input signal or a sensor signal inputted from at least one of the input/output interface 120 and the sensor module 180 to at least one of the processor 160 and the VR management module 170. The bus 190 may deliver at least one of security related contents and restriction release information received through the communication interface 110 to at least one of the memory 130, the display 150, the processor 160, and the VR management module 170. The bus 190 may deliver at least one of security related contents or virtual reality contents stored in the memory 150 to the display 140 in correspondence to a control of the VR management module 170.

The display 140 may display various information (for example, multimedia data or text data). For example, the display 140 may output a lock screen and a standby screen. The display 140 may output a specific function execution screen, for example, a music playback application (app) execution screen, a video playback app execution screen, and a broadcast reception screen, in correspondence to a function execution. According to an embodiment of the present disclosure, when the electronic device 100 is mounted at the mounting frame 200, the display 140 may output security related contents. Alternatively, the display 140 may output security related contents in correspondence to a user input through the input/output interface 120. The display 140 may output input information (for example, at least one of an input signal inputted from the input/output interface 120, a sensor signal delivered from the sensor module 180, and restriction release information received from the communication interface 110) while security related contents are outputted.

According to various embodiments of the present disclosure, the display 140 may output a screen relating to restriction release in correspondence to a valid restriction release information input when security related contents are outputted. The display 140 may output selected virtual reality contents according to set schedule information or a user input when a restriction is released. Alternatively, the display 140 may output new security related contents when a restriction is released. According to various embodiments of the present disclosure, at least part of virtual reality contents outputted to the display 140 may include security related contents. While outputting virtual reality contents in correspondence to a user input or setting, if valid restriction release information in relation to an area where security related contents are disposed is inputted, the display 140 may output security set virtual reality contents by corresponding security related contents.

The memory 150 may store instructions or data received from the processor 160 or the other components (for example, the input/output interface 120, the display 140, the communication interface 110, and the VR management module 170) or generated by the processor 160 or the other components. The memory 150, for example, may include programming modules such as a kernel 151, a middleware 152, an application programming interface (API) 153, or an application 154. Each of the above-mentioned programming modules may be configured with software, firmware, hardware, or a combination of at least two thereof.

The kernel 151 may control or manage system resources (for example, the bus 190, the processor 160, or the memory 150) used for performing operations or functions implemented in the remaining other programming modules, for example, the middleware 152, the API 153, or the application 154. According to an embodiment, the kernel 151 may provide an interface for performing a controlling or managing operation by accessing an individual component of the electronic device 100 from the middleware 152, the API 153, or the application 154.

The middleware 152 may serve as an intermediary role for exchanging data as the API 153 or the application 154 communicates with the kernel 151. According to an embodiment, in relation to job requests received from the application 154, the middleware 152, for example, may perform a control (for example, scheduling or load balancing) for the job requests by using a method of assigning a priority for using a system resource (for example, the bus 190, the processor 160, or the memory 150) of the electronic device 100 to at least one application among the applications 154.

The API 153, as an interface through which the application 154 controls a function provided from the kernel 151 or the middleware 152, for example, may include at least one interface or function (for example, an instruction) for file control, window control, image processing, or character control.

According to various embodiments of the present disclosure, the application 154 may include SMS/MMS applications, e-mail applications, calendar applications, notification applications, health care applications (for example, applications for measuring exercise amount or blood glucose), or environmental information applications (for example, applications for providing pressure, humidity, or temperature information). According to an embodiment, the application 154 may be an application relating to information exchange between the electronic device 100 and an external electronic device (for example, the electronic device 104). The information exchange related application, for example, may include a notification relay application for relaying specific information to the external device or a device management application for managing the external electronic device.

For example, the notification relay application may have a function for relaying to an external electronic device (for example, the electronic device 104) notification information occurring from another application (for example, an SMS/MMS application, an e-mail application, a health care application, or an environmental information application) of the electronic device 100. According to an embodiment, the notification relay application may receive notification information from an external electronic device (for example, the electronic device 104) notification and then provide the received notification information to a user. The device management application, for example, may manage (for example, install, delete, or update) at least part of function (turn-on/turn off of the external electronic device itself (or some components) or the brightness (or resolution) adjustment of a display) of an external electronic device (for example, the electronic device 104) communicating with the electronic device 100, an application operating in the external electronic device, or a service (for example, call service or message service) provided from the external device.

According to various embodiments of the present disclosure, the application 154 may include a specified application according to the property (for example, the type of an electronic device) of the external electronic device (for example, the electronic device 104). For example, when an external electronic device is an MP3 player, the application 154 may include an application relating to music playback. Similarly, when an external electronic device is a mobile medical device, the application 154 may include an application relating to heath care. According to an embodiment of the present disclosure, the application 154 may include at least one of an application specified to the electronic device 100 or an application received from an external electronic device (for example, the server device 106 or the electronic device 104).

According to various embodiments of the present disclosure, the memory 150 may store security related contents, virtual reality contents (or augmented reality contents), or virtual reality contents including security related contents. The memory 150 may store virtual reality contents playback application. The memory 150 may store security setting information 155. The virtual reality contents playback application may be activated in correspondence to a user control or when the electronic device 100 is mounted at the mounting frame 200, may be activated automatically. The virtual reality contents playback application may support a menu function for selecting at least one virtual reality content stored in the memory 150 and a screen providing function relating to an output control of selected virtual reality contents. The virtual reality contents playback application may support at least one security related contents selection supporting function and a function relating to a security setting of selected security related contents. The security setting information 155 set based on the virtual reality contents playback application may be stored in the memory 150.

The security setting information 155 may be information relating to a security setting of specific security related contents. For example, the security setting information 155 may include number information or character information. Alternatively, the security setting information 155 may include various contents management information or contents control information. The security setting information 155 may be newly generated and the generated information may be updated or discarded in correspondence to a user control.

The sensor module 180 may perform a sensor signal generation by using at least one sensor (for example, at least one of a gyro sensor, a proximity sensor, an acceleration sensor, a photo sensor, and a geomagnetic sensor). The sensor module 180 may provide a generated sensor signal to the processor 160 or the VR management module 170. According to various embodiments of the present disclosure, when virtual reality contents playback is requested or the electronic device 100 is mounted at the mounting frame 200, the sensor module 180 may be activated automatically. After mounting at the mounting frame 200, the sensor module 180 may collect a sensor signal corresponding to a movement of the mounting frame 200 and may deliver the collected sensor signal to at least one of the processor 160 and the VR management module 170. When the electronic device 100 is dismounted from the mounting frame 200 or a virtual reality contents application is terminated, the sensor module 180 may be deactivated automatically. According to various embodiments of the present disclosure, the sensor module 180 may be activated or deactivated in correspondence to an input signal generated by at least one of the input device 300 and the input device 220.

The processor 160, for example, may receive instructions from the above-mentioned other components (for example, the memory 150, the input/output interface 120, the display 140, the communication interface 110, and the VR management module 170) through the bus 190, interpret the received instructions, and execute calculation or data processing according to the interpreted instructions. Such the processor 160 may be prepared in a form including the VR management module 170, in a form separated from the VR management module 170, or in a form performing communication on the basis of the bus 190 or directly.

The VR management module 170 may process at least part of information obtained from other components (for example, the processor 160, the memory 150, the input/output interface 120, or the communication interface 110) and may provide the processed information to a user through various methods. For example, the VR management module 170 may control an output of security related contents in correspondence to a user input or the mounting of the electronic device 100 at the mounting frame 200. The VR management module 170 mutually compares restriction release information inputted when security related contents are outputted and the security setting information 155 stored in the memory 150 to detect whether the restriction release information is authenticated. When the restriction release information is valid, the VR management module 170 may release a restriction on access to a resource that is currently active. During this operation, the VR management module 170 may output new security related contents or specific virtual reality contents.

Figure 4:
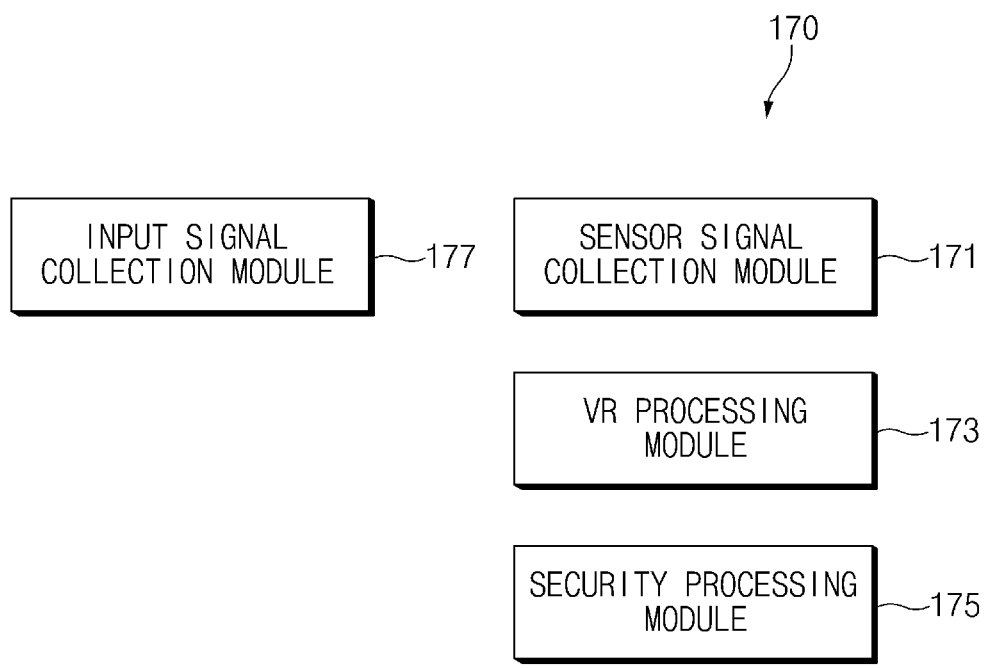
FIG. 4 is a block diagram of an example of a VR management module according to various embodiments of the present disclosure.

FIG. 4 is a diagram illustrating an example of a VR management module according to various embodiments of the present disclosure.

Referring to FIG. 4, the VR management module 170 may include a sensor signal collection module 171, a VR processing module 173, a security processing module 175, and an input signal collection module 177.

The sensor signal collection module 171 may receive a sensor signal generated by the sensor module 180. Alternatively, the sensor signal collection module 171 may receive a sensor signal that the sensor module 280 provides through the communication interface 110. The sensor signal collection module 171 may obtain movement direction and distance information of the mounting frame 200 or the electronic device 100 mounted at the mounting frame 200 by analyzing the sensor signal. The sensor signal collection module 171 may deliver the obtained direction and distance information to the VR processing module 173.

The VR processing module 173 may process virtual reality contents (or augmented reality contents). For example, when a virtual reality contents application is activated, the VR processing module 173 may control at least one image processing of security related contents or virtual reality contents in correspondence to a user input. According to an embodiment of the present disclosure, the VR processing module 173 virtually divides the area of the display 140 into a plurality of areas and outputs images corresponding to virtual reality contents to each of the divided areas. According to an embodiment of the present disclosure, the VR processing module 173 may perform image processing on specific security related contents in correspondence to a request of the VR management module 170 and may output data generated as a result of the image processing to the display 140. Additionally or alternatively, the VR processing module 173 may output security related contents to a plurality of divided areas of the display 140 simultaneously or sequentially. The VR processing module 173 may support a change of corresponding contents, for example, zoom-in or zoom-out image processing, in correspondence to a signal from the input/output interface 120 or the sensor module 180.

According to various embodiments of the present disclosure, the VR processing module 173 may perform viewport processing or view pointer processing while outputting security related contents or virtual reality contents to the display 140. The viewport may include an area displayed on the display 140 in an entire screen area. Alternatively, the viewport may include a portion of the area. The view pointer may be a virtual view pointer (for example, a virtually drawn arrow or a highlight box) for selecting a specific point on the display 140 or selecting an object.

In some implementations, the VR processing module 173 may control a movement of a viewport and/or a screen change in correspondence to at least one of direction information and distance information obtained from a sensor signal. In a similar manner, the VR processing module 173 may control the movements of a view pointer in correspondence to at least one of direction information and distance information obtained from a sensor signal.

According to various embodiments of the present disclosure, the VR processing module 173 may define an entire screen area (for example, a partial screen displayed on the display unit 140 and an entire screen continuing from the partial screen) according to types or characteristics of virtual reality contents or security related contents and may store it in the memory 150. The VR processing module 173 may change a viewport area in an entire screen area in correspondence to at least one of direction information and distance information delivered by the sensor signal collection module 171. The VR processing module 173 execute a zoom-in function in relation to an area specified by a viewport in an entire screen area or a specific link function (for example, a contents playback function and a function for moving to a link located in a viewport area) allocated to an area specified by a corresponding viewport. According to various embodiments of the present disclosure, the VR processing module 173 may control a view pointer movement in a viewport area in correspondence to at least one of direction information and distance information delivered by the sensor signal collection module 171. In some instances, when the entire screen of contents is fixed as a viewport area, the VR processing module 173 may move and display a view pointer in the viewport area.

According to various embodiments of the present disclosure, the VR processing module 173 may temporarily or semi-permanently fix a viewport area in an entire screen area according to a received input signal (for example, at least one of an input signal delivered by the input/output interface 120, a input signal delivered by the input device 220 prepared at the mounting frame 200, and an input signal delivered by the input device 300). Then, the VR processing module 173 may move a view pointer within a viewport area in correspondence to at least one of direction information and distance information. According to various embodiments of the present disclosure, the VR processing module 173 may move a view pointer in correspondence to at least one of direction information and distance information while an input signal is maintained. When the input signal is released, the VR processing module 173 may move the viewport in correspondence to at least one of direction information and distance information.

According to various embodiments of the present disclosure, the VR processing module 173 may execute a function relating to an object disposed in an area indicated or selected by a view pointer or may control a display change (for example, enlarging or reducing and displaying contents) of an object. Alternatively, the VR processing module 173 may perform at least one of moving, copying, and removing an object selected with a view pointer in correspondence to direction information and distance information.

According to various embodiments of the present disclosure, the VR processing module 173 may deliver information relating to an object indicated by at least one of a viewport and a view pointer in an environment where security related contents are outputted or screen information relating to a screen area (for example, location information on where a viewport is located in an entire screen area, a moving path of a viewport, location information indicated or selected by a view pointer, moving information of a view pointer, and information relating to an object selected by a view pointer) to the security processing module 175. When receiving a restriction release request from the security processing module 175, the VR processing module 173 stops the display of security related contents and outputs virtual reality contents according to schedule information or user input.

According to various embodiments of the present disclosure, the VR processing module 173 may display virtual reality contents including part of a security related object to be outputted to the display 140. When a viewport is disposed in an area other than an area where a security related object is disposed, the VR processing module 173 may initiate a corresponding virtual reality contents playback function or a virtual reality contents function execution. Alternatively, the VR processing module 173 may initiate a virtual reality contents related function before a security related object is indicated or selected by a view pointer.

The security processing module 175 may receive screen information including information relating to at least one object from the VR processing module 173 when security related contents are outputted to the display 140. Alternatively, the security processing module 175 may receive screen information from the VR processing module 173 when virtual reality contents including a security related object are outputted to the display 140. The security processing module 175 may compare the received screen information with security setting information 155 stored in the memory 150 and when the received screen information is valid (for example, when the screen information is identical to (or otherwise matching) the security setting information 155), may release a restriction on accessing a particular resource. The security processing module 175 may deliver a message or instruction relating to the restriction release to the VR processing module 173.

According to various embodiments of the present disclosure, the security processing module 175 may receive restriction release information from at least one of the mounting frame 200 or the input device 300, the input/output interface 120, and another electronic device (for example, the electronic device 104). For example, the restriction release information, for example, may include specific number information or character information received from the input device 300 or the input/output interface 120. Alternatively, the restriction release information may include number information or character information transmitted by another electronic device. According to various embodiments of the present disclosure, the restriction release information may include an indication of a specific movement (for example, a head gesture of a user wearing the mounting frame 200) of the mounting frame 200. The security processing module 175 may compare the received restriction release information with the security setting information 155 and when the restriction release information is valid, may deliver a message or instruction relating to the release of an active restriction on access to a resource to the VR processing module 173.

The input signal collection module 177 may collect an input signal delivered from the input device 300, the input/output interface 120, and the input device 220 of the mounting frame 200. The input signal collection module 177 may deliver the delivered input signal to the VR processing module 173 or the security processing module 175 according to current context. For example, when an input signal is received while virtual reality contents is output, the input signal collection module 177 may deliver a corresponding input signal to the VR processing module 173. Alternatively, when an input signal is received while security related contents is output, the input signal collection module 177 may deliver a corresponding input signal to the security processing module 175 or the VR processing module 173. When an input signal is received while virtual reality contents including a security related object is output, and at least one of a viewport and a view pointer indicates or selects a security related object, a corresponding input signal may be delivered to the security processing module 175. Alternatively, when a viewport outputs or a view pointer indicates or selects an area other than a security related object, the VR processing module 173 may deliver an input signal to the VR processing module 173.

According to various embodiments of the present disclosure, an input signal received by the input signal collection module 177 may be restriction release information compared to the security setting information 155. Additionally or alternatively, an input signal received by the input signal collection module 177 may be part of restriction release information compared to the security setting information 155. For example, the security processing module 175 may compare screen information delivered by the VR processing module 173 and an input signal delivered by the input signal collection module 177 with the security setting information 155. According to various embodiments of the present disclosure, an input signal provided by the input signal collection module 177 may be used as an initialization signal for collecting screen information for the purpose of releasing an active access restriction. According to an embodiment, an input signal provided by the input signal collection module 177 may be used as a signal for terminating the screen information collection in relation to security.

According to various embodiments of the present disclosure, an electronic device may include a display for outputting security related contents for restriction release and a VR management module for identifying an object relating to the received sensor signal or input signal on the security related contents and determining whether to release an active restriction on access to a resource by comparing information relating to the object with specified security setting information.

According to various embodiments of the present disclosure, the VR management module may receive a sensor signal relating to a movement of a mounting frame where an electronic device outputting the security related contents is mounted and an input signal received from at least one input device of an input device prepared at the mounting frame, an input device prepared at the electronic device, and an input device communicable with the electronic device.

According to various embodiments of the present disclosure, the VR management module may check whether there is at least one object specified in a viewport displaying at least partial area of the security related contents, check whether at least one specified object is indicated for a predetermined time specified by the viewport, or check whether at least one specified object is disposed in a specified location in the viewport.

According to various embodiments of the present disclosure, the VR management module may be set to collect at least one of viewport related information relating to a viewport displaying at least a partial area of the security related contents and view pointer related information relating to a view pointer indicating a predetermined point in the viewport.

According to various embodiments of the present disclosure, the VR management module may be set to fix a viewport displaying a partial screen area in a screen area corresponding to the security related contents by the input signal and collect information relating to an object that a virtual view pointer indicates or selects in the viewport.

According to various embodiments of the present disclosure, when a virtual view pointer indicates at least one object included in the security related contents, the VR management module may be set to collect information relating to the indicated object in correspondence to a specified input signal occurrence.

According to various embodiments of the present disclosure, when a specified input signal is inputted, the VR management module may be set to initialize or terminate security related information collection.

According to various embodiments of the present disclosure, the VR management module may set at least one of the collection of screen information of an area displayed by a viewport in a screen area corresponding to the security related contents while a specified input signal is maintained, the screen information collection of an area displayed by a viewport in a screen area corresponding to the security related contents during a time difference of inputted input signals, the information collection relating to at least one object selected by a view pointer while a specified input signal is maintained, and the information collection relating to an object selected by a view pointer in a screen area corresponding to the security related contents during a time difference of inputted input signals.

According to various embodiments of the present disclosure, when at least one object included in the security related contents is selected, the VR management module may be set to change the at least one object in correspondence to at least one of the sensor signal and the input signal and to collect information relating to the changed object.

According to various embodiments of the present disclosure, the VR management module may be set to collect information relating to a viewport movement displaying a partial area of the security related contents in relation to a moving object included in the security related contents.

According to various embodiments of the present disclosure, the VR management module may set an output control of at least one of new security related contents during the restriction release, virtual reality contents including a security related object, and virtual reality contents.

According to various embodiments of the present disclosure, the VR management module may be set to output the security related contents on the basis of virtual reality.

Figure 5:
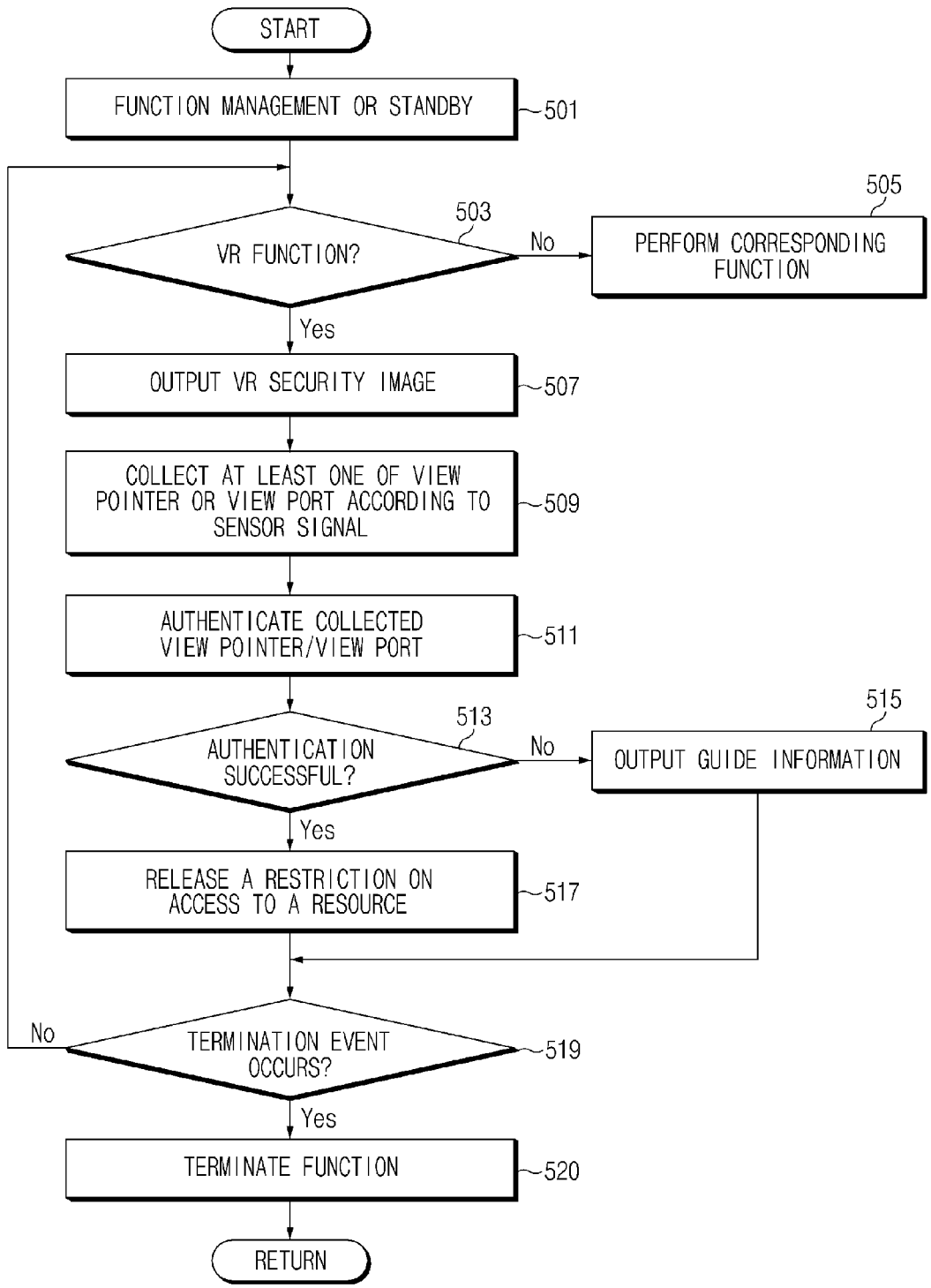
FIG. 5 is a flowchart of an example of a process, according to various embodiments of the present disclosure.

FIG. 5 is a flowchart of an example of a process, according to various embodiments of the present disclosure.

In operation 501, the VR management module 170 may perform a specific function management or a function standby in correspondence to set schedule information or a user input. For example, the VR management module 170 may perform a lock screen output function, a sound source playback function, a web access function, and a weather information providing function in correspondence to schedule information or a user input. Alternatively, if there is no schedule information or user input, the VR management module 170 may maintain a sleep mode (for example, when the display 140 is turned off) or may maintain a function in previous execution. During this operation, the VR management module 170 may output an icon or a menu item for selecting a VR related function (a virtual reality contents output function or a virtual reality based security related contents output function). Alternatively, the VR management module 170 may provide a function interoperation setting item with the mounting frame 200.

In operation 503, the VR management module 170 may detect whether an event relating to VR function activation occurs. For example, the VR management module 170 may detect whether an event relating to a selection of a menu item or icon relating to a VR function occurs. Alternatively, the VR management module 170 may detect whether the electronic device 100 is mounted at the mounting frame 200. Alternatively, the VR processing module 170 may check whether there is an event occurrence relating to a virtual reality contents or virtual reality based security related contents playback.

If there is no event occurrence relating to VR function activation, the VR management module 170 may control a function performance corresponding to the type of an occurring event in operation 505. Alternatively, if there is additional event occurrence, the VR management module 170 may perform a control to maintain a previous function management state or a function standby state or perform a control to shift to a sleep mode (for example, when the display 140 is turned off) in correspondence to a specified time elapse. According to another embodiment, the VR management module 170 may again execute operation 503.

If an event relating to VR function activation occurs, the VR management module 170 may output security related contents, such as a VR security image in operation 507. During this operation, the VR management module 170 may output a security image by default. Alternatively, the VR management module 170 may output virtual reality contents and when an event selecting a security related object occurs, the VR management module may further output a security related image. According to an embodiment of the present disclosure, the VR management module 170 may output a security image to a screen split display 140 to correspond to the mounting frame 200. The security related image may include at least one of an image where numbers are arranged, an image where characters are arranged, an image where an object having at least one specific form is arranged, and an image where a virtual view pointer is placed.

In operation 509, the VR management module 170 may collect at least one of a view pointer and a viewport according to a sensor signal. According to an embodiment of the present disclosure, the VR management module 170 may fix a viewport when a security related image has a size corresponding to the screen size of the display 140. The VR management module 170 may output a view pointer to the display 140 and may control a movement display of a view pointer in correspondence to at least one of direction information and movement distance information delivered from the sensor module 180. The VR management module 170 may collect view pointer related information including movement path information of a view pointer, location information of a view pointer, and information relating to an object that the view pointer selects.

According to various embodiments of the present disclosure, when an entire screen area of contents displayed on the display 140 is greater than the size of the display 140, the VR management module 170 may collect information on viewport location in the entire screen area. Herein, the VR management module 170 may move the viewport in correspondence to at least one of direction information and distance information according to a movement. The VR management module 170 may collect viewport related information. The viewport related information may include information relating to at least one object included in security related contents or virtual reality contents. For example, the viewport related information may include at least one of location information of a point at which a viewport is fixed for more than a specified time, movement path information of a viewport, and at least one object included in a viewport. According to various embodiments of the present disclosure, the VR management module 170 may collect viewport related information after a specified input signal is received. According to an embodiment, when a specified input signal is received, the VR management module 170 may stop the viewport related information collection.

According to various embodiments of the present disclosure, when a specific input signal is received, the VR management module 170 may fix the current viewport area temporarily or semi-permanently in the entire screen area. The VR management module 170 may collect information relating to at least one object disposed in a temporarily fixed viewport area, for example, view pointer related information. According to various embodiments of the present disclosure, when a specified input signal is inputted, the VR management module 170 may stop the view pointer related information collection.

In operation 511, the VR management module 170 may perform view pointer/viewport authentication. For example, the VR management module 170 may compare at least one of the collected view pointer related information and viewport related information with the security setting information 155. In relation to this, a user may perform the generation or change of the security setting information 155 on specific security related contents. The electronic device 100 may provide a screen interface relating to the generation or change of the security setting information 155. A user may generate or change the security setting information 155 to be applied to specific security related contents in the generation or change screen of the security setting information 155. A screen interface relating to the generation or change of the security setting information 155 may be displayed on the display 140 of the electronic device 100 in response to an input received via the input/output interface 120. Alternatively, the screen interface relating to the generation or change of the security setting information 155 may be provided based on the current state of the mounting frame 200. In relation to this, the electronic device 100 mounted at the mounting frame 200 may provide a menu item relating to the generation or change of the security setting information 155 of specific security related contents.

In operation 513, the VR management module 170 may detect whether the authentication is successful. For example, when screen information including at least one of view pointer related information or viewport related information or restriction release information is identical to (or otherwise matching) the security setting information 155, the VR management module 170 may determine that the authentication is successful.

If the authentication is unsuccessful, the VR management module 170 may control a guide information output in operation 515. For example, the VR management module 170 may control a message output that notifies an information input error. Alternatively, the VR management module 170 may transmit a message notifying the information input error to another electronic device that has transmitted the restriction release information before. When at least partial restriction release information is inputted through the input device 300, the VR management module 170 may transmit a vibration message of a pattern corresponding to the information input error to the input device 300. The input device 300 may perform a vibration corresponding to the received vibration message. According to various embodiments of the present disclosure, the vibration message may be delivered to the mounting frame 200 and the mounting frame 200 may generate a vibration corresponding to the vibration message on the basis of a built-in vibration module. In relation to this, the mounting frame 200 may further include a vibration module.

If the authentication is successful, in operation 517, the VR management module 170 may release a restriction on access to a resource of the electronic device. For example, the resource may include any suitable type of hardware and/or software resource of the electronic device. Thus, in some instances, releasing the restriction may give the user access to particular content via the electronic device and/or particular function that the electronic device is capable of performing. For example, the VR management module 170 may hide the screen corresponding to security related contents and may display virtual reality contents on the display 140 according to schedule information or a user input. In some implementation, the VR management module 170 may perform a secondary authentication procedure by displaying new security related contents in correspondence to a setting. According to various embodiments of the present disclosure, the VR management module 170 may output virtual reality contents including a security related object.

In operation 519, the VR management module 170 may detect whether an event relating to a function termination occurs. When the event relating to a function termination occurs, the VR management module 170 may terminate a VR function. When the event relating to a function termination does not occur, the VR management module 170 returns to operation 503.

Figure 6:
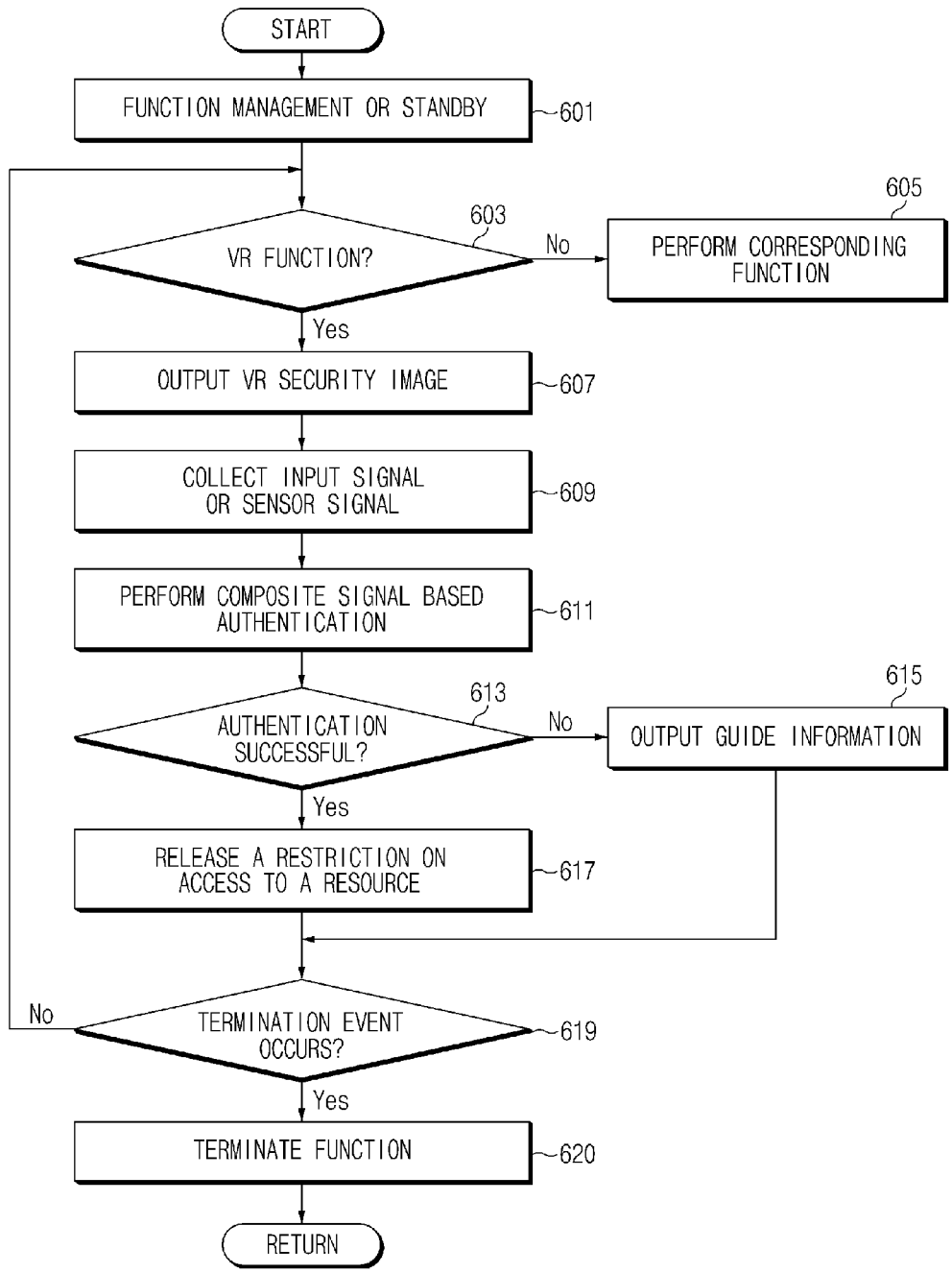
FIG. 6 is a flowchart of an example of a process, according to various embodiments of the present disclosure.

FIG. 6 is a flowchart of an example of a process, according to various embodiments of the present disclosure.

In operation 601, the VR management module 170 may perform a specific function management or a function standby in correspondence to set schedule information or a user input. For example, the VR management module 170 may automatically execute a specific function set in schedule information. Alternatively, if there is a user input and a specified time elapses, the VR management module 170 may enter a sleep mode and perform a function standby. Alternatively, the VR management module 170 may output a menu screen or standby screen to the display 140 and may control a function standby to execute a function according to a user input. According to an embodiment of the present disclosure, the VR management module 170 may provide at least one item relating to VR function activation. For example, the VR management module 170 may output a menu or icon relating to a virtual reality contents execution and a key button setting for switching into a virtual reality contents execution mode. According to various embodiments of the present disclosure, the VR management module 170 may maintain the related communication interface 110 to be in a standby state (for example, maintain power) in order to establish a communication channel with the mounting frame 200.

In operation 603, the VR management module 170 may detect whether an event relating to VR function activation occurs. For example, as the electronic device 100 is mounted at the mounting frame 200, the VR management module 170 may detect whether an event recognizing the mounting of the mounting frame 200 occurs through the communication interface 110. Alternatively, the VR management module 170 may detect whether an event occurs that corresponds to a section of the above-described menu, icon, or key button. According to various embodiments of the present disclosure, the VR management module 170 may detect whether a specified input signal (for example, an input signal requesting a virtual reality contents management) occurs from the input device 300 relating to a virtual reality contents management.

If there is no event occurrence relating to VR function activation, the VR management module 170 may control (for example, sound source playback control, broadcast reception control, and contents search control) a function performance corresponding to the type of an occurring event in operation 605. Alternatively, if there is additional event occurrence, the VR management module 170 may perform a control to maintain a previous function management state or a function standby state or perform a control to shift to a sleep mode (for example, when the display 140 is turned off) in correspondence to a specified time elapse. According to another embodiment, the VR management module 170 may again execute operation 603. If an event relating to VR function activation occurs, the VR management module 170 may output a VR security image in operation 607. The VR management module 170 may output a VR security image (or security related contents) by default in relation to a virtual reality contents playback. Alternatively, the VR management module 170 may output virtual reality contents including a security related object and when an event selecting a security related object occurs, may control a VR security image output. The VR management module 170 may support a function included in virtual reality contents or an object search function before the indication or selection of a security related object.

In operation 609, the VR management module 170 may detect at least one of an input signal and a sensor signal. For example, the VR management module 170 may detect an input signal generated by at least one of the input device 300 and the input device 220 and a sensor signal provided by the sensor module 280 of the mounting frame 200. During this operation, the VR management module 170 may deactivate the sensor module 180. According to various embodiments of the present disclosure, the VR management module 170 may deactivate the sensor module 280 of the mounting frame 200 and may collect a sensor signal provided by the sensor module 180 of the electronic device 100. According to various embodiments of the present disclosure, the VR management module 170 may obtain at least one of movement direction information and movement distance information of the mounting frame 200 by synthetically analyzing a sensor signal provided by the sensor module 280 of the mounting frame 200 and a sensor signal provided by the sensor module 180. The VR management module 170 may obtain screen information including at least one of viewport related information and view pointer related information, which are changed in correspondence to at least one of movement direction information and movement distance information.

In operation 611, the VR management module 170 may perform a composite signal based authentication. According to an embodiment of the present disclosure, the VR management module 170 may check whether an input signal and obtained screen information are identical to (or otherwise matching) the security setting information 155. According to various embodiments of the present disclosure, the VR management module 170 may obtain screen information in real time. As one example, the VR management module 170 may extract screen information obtained when a specified input signal is generated. The VR management module 170 may detect whether the extracted screen information is identical to (or otherwise matching) the security setting information 155. According to various embodiments of the present disclosure, the VR management module 170 may obtain screen information in real-time but may compare screen information obtained while a specified input signal is maintained with the security setting information 155. According to various embodiments of the present disclosure, the VR management module 170 may compare screen information corresponding to a section where a first input signal and a second input signal are inputted with the security setting information 155. According to various embodiments of the present disclosure, after performing the comparison of the security setting information 155 on a specified input signal, if a corresponding input signal is valid, the VR management module 170 may perform the screen information acquisition and the comparison of the security setting information 155. According to various embodiments of the present disclosure, if corresponding screen information is valid (for example, when the screen information is identical to screen information stored in the security setting information 155) after comparing the obtained screen information with the security setting information 155, the VR management module 170 may check whether an input signal similar to an input signal stored in the security setting information 155 is collected.

In operation 613, the VR management module 170 may detect whether the authentication is successful. For example, if information is collected that is identical to (or otherwise matching) information stored in the security setting information 155 the VR management module 170 may determine that the authentication is successful.

If the authentication is unsuccessful, the VR management module 170 may control a guide information output in operation 615. For example, the VR management module 170 may output a message notifying that wrong information is inputted to the display 140. According to various embodiments of the present disclosure, the VR management module 170 may output a vibration pattern indicating the occurrence of an error to at least one of the electronic device 100 and the mounting frame 200. According to various embodiments of the present disclosure, the VR management module 170 may output audio data indicating the occurrence of an error.

If the authentication is successful, in operation 617, the VR management module 170 may release a restriction on access to a resource of the electronic device. For example, the resource may include any suitable type of hardware and/or software resource of the electronic device. Thus, in some instances releasing the restriction may give the user access to particular content via the electronic device and/or particular function that the electronic device is capable of performing. For example, the VR management module may output a notification indicating that a restriction is released. The notification may include a visual notification, an audible notification, and/or a vibration notification. The VR management module 170 may then provide a set menu screen or an icon arrangement screen or output a specified specific contents playback or image screen after the restriction is released.

In operation 619, the VR management module 170 may detect whether an event relating to a function termination occurs. When the event relating to a function termination occurs, the VR management module 170 may terminate a VR function. When the event relating to the function termination does not occur, the VR management module 170 returns to operation 603.

According to various embodiments of the present disclosure, a security management method includes displaying security related contents for restriction release, receiving at least one of a sensor signal and an input signal while the security related contents are outputted, collecting an object relating to the security related contents in correspondence to at least one of the received sensor signal and input signal, comparing information relating to the object and specified security setting information, and determining whether to release an access restriction on access to a resource in correspondence to the comparison result.

According to various embodiments of the present disclosure, the receiving of the at least one includes receiving a sensor signal relating to a movement of an electronic device outputting the security related contents or a mounting frame where an electronic device is mounted and receiving an input signal from at least one input device of an input device prepared at the mounting frame, an input device prepared at the electronic device, and an input device communicable with the electronic device.

According to various embodiments of the present disclosure, the comparing of the information includes checking viewport related information relating to a viewport displaying at least a partial area of the security related contents and checking there is at least one specified object located in a viewport, checking whether at least one specified object is indicated by the viewport for a specified time, and checking whether at least one specified object is disposed at a specified location within the viewport.

According to various embodiments of the present disclosure, the collecting of the object may include collecting at least one of view pointer related information relating to a view pointer that indicates a predetermined point within the viewport.

According to various embodiments of the present disclosure, the collecting of the object may include at least one of fixing a viewport displaying a partial screen area in a screen area corresponding to the security related contents by the input signal and collecting information relating to an object that a virtual view pointer indicates or selects in the viewport.

According to various embodiments of the present disclosure, the collecting of the object may include indicating, by a virtual view pointer, at least one object included in the security related contents and collecting information relating to the indicated object in correspondence to a specified input signal occurrence.

According to various embodiments of the present disclosure, the determining of whether to release a restriction on access to a resource may include at least one of initializing security related information collection when a specified input signal is inputted and terminating security related information collection when a specified input signal is inputted.

According to various embodiments of the present disclosure, the collecting of the object may include collecting information relating to an object of an area displayed by a viewport in a screen area corresponding to the security related contents while a specified input signal is maintained, collecting information relating to an object of an area displayed by a viewport in a screen area corresponding to the security related contents during a time difference of input signals, collecting information relating to at least one object selected by a view pointer while a specified input signal is maintained, and collecting information relating to an object selected by a view pointer in a screen area corresponding to the security related contents during a time difference of input signals.

According to various embodiments of the disclosure, the collecting of the object may include selecting at least one object included in the security related contents, changing the at least one object in correspondence to at least one of the sensor signal and the input signal, and collecting information relating to the changed object.

According to various embodiments of the present disclosure, the collecting of the object may include collecting information relating to a viewport movement indicating a partial area of the security related contents in relation to a moving object included in the security related contents.

According to various embodiments of the present disclosure, the method may further include at least one of outputting new security related contents during the restriction release, outputting virtual reality contents including a security related object during the restriction release, and outputting virtual reality contents corresponding to set information or a user input during the restriction release.

According to various embodiments of the present disclosure, the displaying of the security related contents may include virtual reality based security related contents.

Figure 7A:
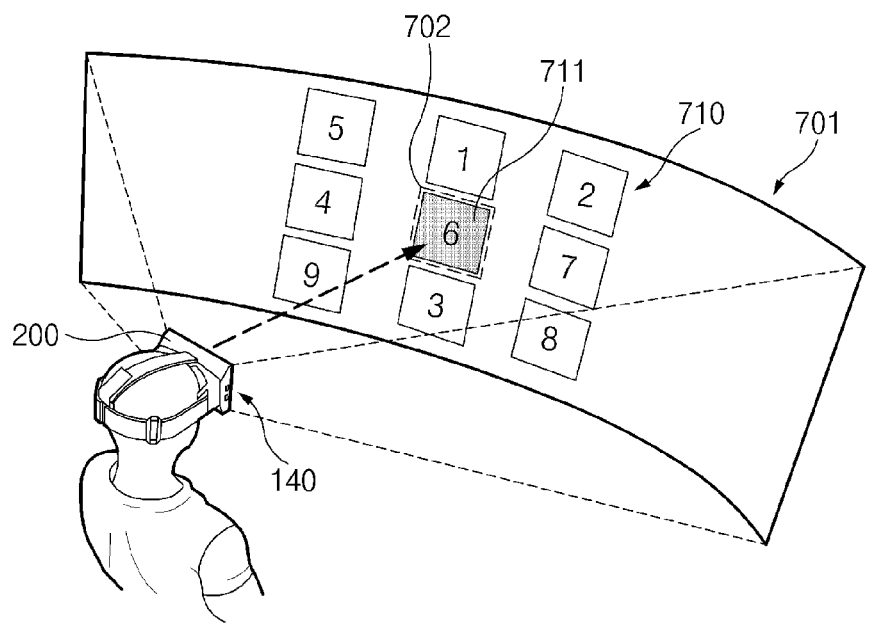
FIG. 7A is a view illustrating a view pointer based restriction release according to various embodiments of the present disclosure.

FIG. 7A is a view illustrating a view pointer based restriction release according to various embodiments of the present disclosure.

Referring to FIG. 7A, a user may wear the mounting frame 200, as shown. The mounting frame may be equipped with the electronic device 100. A user may view an image displayed on the display 140 of the electronic device 100 through a predetermined area prepared at the mounting frame 200. Herein, an image outputted to the display 140 may be virtual reality contents. For example, the virtual reality contents may be contents where one or more images (e.g., 2D or 3D image(s)) are outputted to divided areas of the display 140. When a screen according to a virtual reality contents playback is outputted to the display 140, a user may view a screen outputted to the display 140 through the mounting frame 200 so that the user may perceive the screen in a form that is more enlarged than that of the screen displayed on the display 140, three-dimensionally, or synesthetically.

According to an embodiment of the present disclosure, the mounting frame 200 equipped with the electronic device 100 may support a user to feel an enlarged or three-dimensional image as shown in the drawing. Herein, the VR management module 170 may output the security related contents 710 (or security related image) in correspondence to a setting. The security related contents 710 may be provided automatically in response to the electronic device 100 being mounted at the mounting frame 200. Additionally or alternatively, the security related contents 710 may be outputted in correspondence to a specific event occurrence while virtual reality contents are outputted to the electronic device 100.

The security related contents 710, as shown in the drawing, may have a size identical or similar to the size of the viewport 701. In correspondence to this, the VR management module 170 may provide a fixed viewport 701 with respect to the outputted security related contents 710. According to various embodiments of the present disclosure, the security related contents 710 may have a screen area larger than the size of the viewport 701. In this case, an area being outputted to the viewport 701 may be a partial area in the entire screen area of the security related contents 710. When the viewport 701 displays a partial area in the entire screen area, the VR management module 170 may support a movement of the viewport 701 in correspondence to at least one of an input signal and a sensor signal. The security related contents 710, for example, may be an image where at least one numeric object is disposed.

According to various embodiments of the present disclosure, the VR management module 170 may output a view pointer 702 on the security related contents 710. The view pointer 702 may indicate a specific area by default. According to various embodiments of the present disclosure, when a specified input signal is generated from the input device 300 or the input device 220, the VR management module 170 may output the view pointer 702. The VR management module 170 may collect an object 711 (for example, number 6) that is selected with the view pointer 702 as screen information relating to restriction release. The object may be selected by placing the view pointer on the object for a predetermined time or detecting a specific input signal when the view pointer 702 is placed on the object.

Figure 7B:
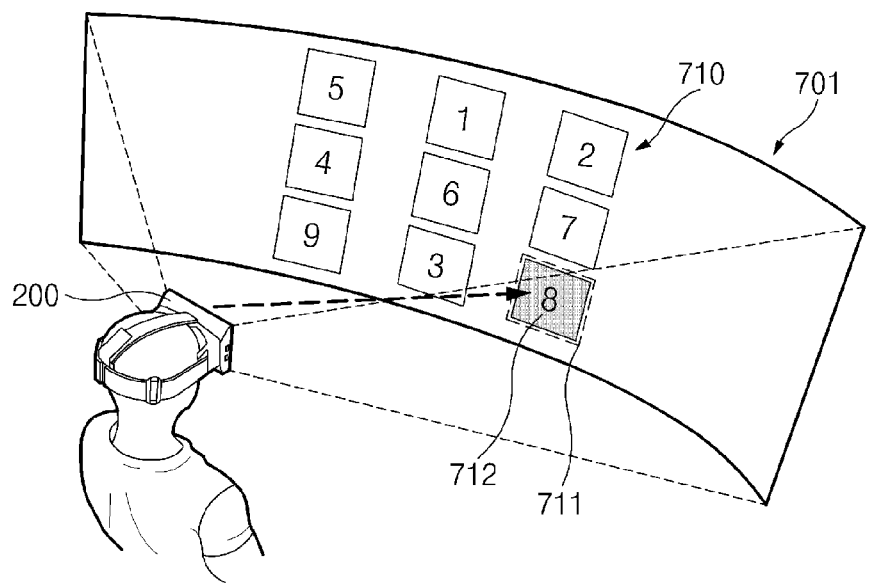
FIG. 7B is a view illustrating a view pointer movement and a restriction release according thereto according to various embodiments of the present disclosure.

FIG. 7B is a view illustrating a view pointer movement and a restriction release according thereto according to various embodiments of the present disclosure.

Referring to FIG. 7B, the VR management module 170 may output the security related contents 710 through the display 140. The security related contents 710, for example, may be displayed with a size corresponding to the size of the viewport 701. The VR management module 170 may collect a sensor signal according to a movement of the mounting frame 200. The VR management module 170 may extract at least one of movement direction information and movement distance information of the mounting frame 200 by analyzing the collected sensor signal. The VR management module 170 may move and display the view pointer 702 to correspond to movement direction information and movement distance information. For example, when the mounting frame 200 moves in a right-bottom diagonal direction by a predetermined distance, the VR management module 170 may move the view pointer 702 by a corresponding direction and distance. Accordingly, the view pointer 702 may be disposed on the object 712 (for example, number 8). When the view pointer 702 is located on the specified object 712 for a specified time or a specified input signal occurs or a specified movement operation of the mounting frame 200 occurs, the VR management module 170 may obtain the object 712 as screen information for restriction release.

According to an embodiment, the VR management module 170 may move and display the view pointer 702 in correspondence to the movements of the mounting frame 200. The VR management module 170 may obtain screen information corresponding to an indicated or selected object after the movement display of the view pointer 702. For example, the VR management module 170 may obtain screen information corresponding to other numeric objects (for example, 1, 2, 3, and 4) in correspondence to the movement of the view pointer 702. For example, when screen information corresponding to a specific object is obtained, the VR management module 170 may change the security related contents 710. For example, the VR management module 170 may perform an output by changing the positions of numeric objects or changing numeric values.

When screen information is collected, the VR management module 170 may detect a value (for example, a numeric value) allocated to the collected screen information. The VR management module 170 may compare the detected values and the security setting information 155 and then, may determine whether to release an active restriction on access to a resource according to whether the detected values are identical to (or otherwise matching) the security setting information 155. During restriction release, the VR management module 170 may stop the output of the security related contents 710 and may output virtual reality contents corresponding to a predetermined or user input or other security related contents.

Figure 8A:
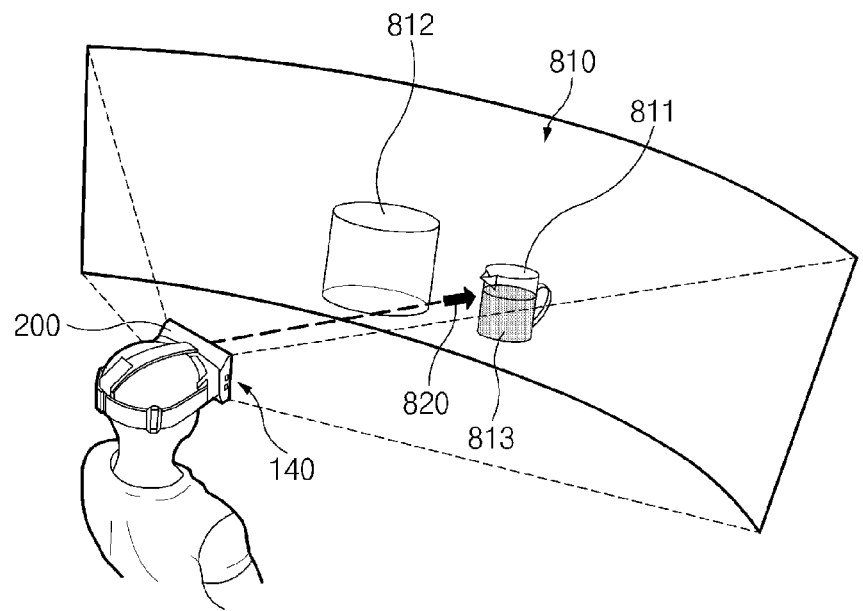
FIG. 8A is a view illustrating an object based restriction release according to various embodiments of the present disclosure.

FIG. 8A is a view illustrating an object based restriction release according to various embodiments of the present disclosure.

Referring to FIG. 8A, the electronic device 100 mounted at the mounting frame 200 may output security related contents 810 to the display 140. The security related contents 810, as shown in the drawing, may include at least one or more objects 811 and 812. According to an embodiment of the present disclosure, the at least one or more objects 811 and 812 may include an object 811 corresponding to a container containing liquids 813 and an object 812 corresponding to an empty container. At least one of the object 811 and the object 812 may be a movable object in correspondence to at least one of an input signal and a sensor signal.

According to various embodiments of the present disclosure, the security related contents 810 may be provided as an initial screen when a virtual reality contents playback function is executed. Alternatively, the security related contents 810 may be outputted after the user is successfully authenticated by using the procedure described with reference to FIG. 7A or 7B. Alternatively, the security related contents 810 may be outputted when a specific object included in virtual reality contents is selected. The above-mentioned security related contents 810 may be replaced in more various forms or another object may be additionally further disposed therein.

Figure 8B:
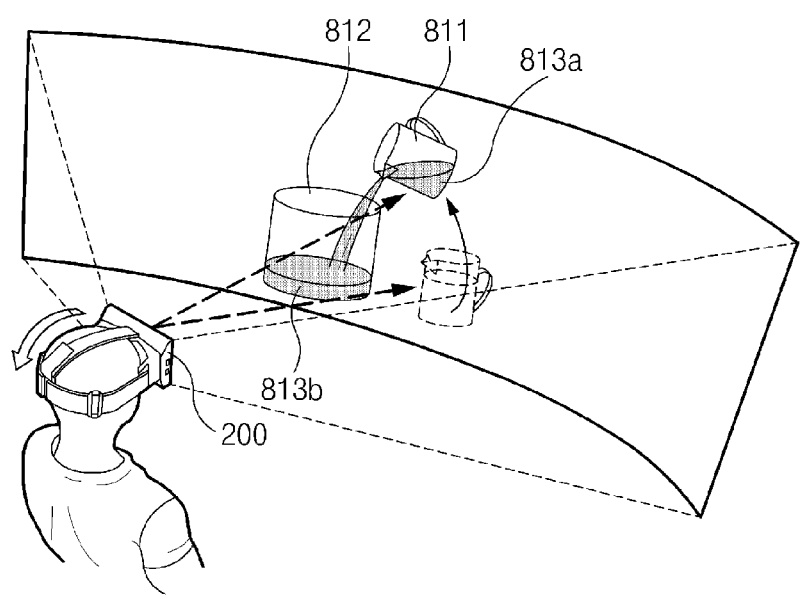
FIG. 8B is a view illustrating an object based restriction release according to various embodiments of the present disclosure.

FIG. 8B is a view illustrating an object based restriction release according to various embodiments of the present disclosure.

Referring to FIG. 8B, according to an embodiment of the present disclosure, the object 811 may be disposed to be movable on the security related contents 810 in correspondence to an input signal or a sensor signal. For example, the object 811 may be disposed in a state inclined at a predetermined angle as the position is changed in a state shown in FIG. 8A. In relation to this, the VR management module 170 may support to select the object 811 by using a view pointer or may provide a state in which the movable object 811 is selected by default. The VR management module 170, for example, moves the position of the object 811 and disposes it in an inclined state as shown in the drawing in correspondence to a rotation operation (for example, an operation corresponding to a head rotating or tilting operation) of the mounting frame 200.

When the object 811 is tilted at more than a predetermined angle, the VR management module 170 may change a display form of the liquids 813 disposed in the object 811. When the object 811 is tilted at more than a predetermined angle, the VR management module 170 may perform processing to move the liquids 813 disposed in the object 811 from the object 811. Herein, the VR management module 170 may move the liquids 813 disposed at the object 811 to the object 812. The VR management module 170 may adjust the amount and speed of the moving liquids 813 in correspondence to a tilting angle of the object 811. In correspondence to this, the VR management module 170 may adjust the speed at which the object 812 is filled with the liquids 813b.

The VR management module 170 may compare at least one information of information relating to the amount of the liquids 813a remaining in the object 811 and information relating to the amount of the liquids 813b filling the object 812 with the security setting information 155. When the collected information is identical to (or otherwise matching) the security setting information 155, the VR management module 170 may release an active restriction on access to a resource and may stop the output of the security related contents 810. Then, the VR management module 170 may support a virtual reality contents output according to a set or user input. Alternatively, the VR management module 170 may output new security related contents.

Figure 9A:
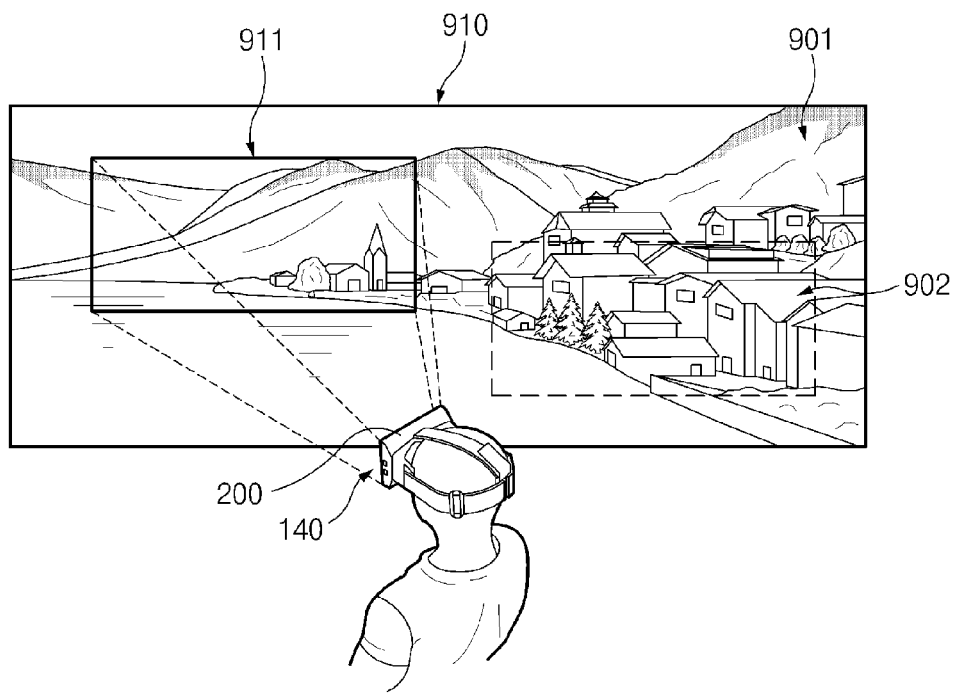
FIG. 9A is a view illustrating a view port disposed in a partial area in an entire screen area according to various embodiments of the present disclosure.

FIG. 9A is a view illustrating a viewport disposed in a partial area in an entire screen area according to various embodiments of the present disclosure.

Referring to FIG. 9A, when an event (for example, an event for mounting the electronic device 100 at the mounting frame 200, an event for requesting a virtual reality contents selection and execution, an event for turning on the mounting frame 200, and an event occurring from the input device 300 or the input device 200) relating to a VR function execution occurs, the VR management module 170 may output specified security related contents 910 to the display 140 as shown in a state 910. The security related contents 910 may have a broader screen in comparison to the area of the viewport 911. Accordingly, the area of the viewport 911 displayed on the display 140 may be a partial area of the security related contents 910. According to an embodiment of the present disclosure, the security related contents 910 may include a virtual reality object 901 and a security related object 902. When the viewport 911 is disposed on the virtual reality object 901, the VR management module 170 may control a screen output set in a corresponding virtual reality object 901 or a function execution set in the virtual reality object 901.

Figure 9B:
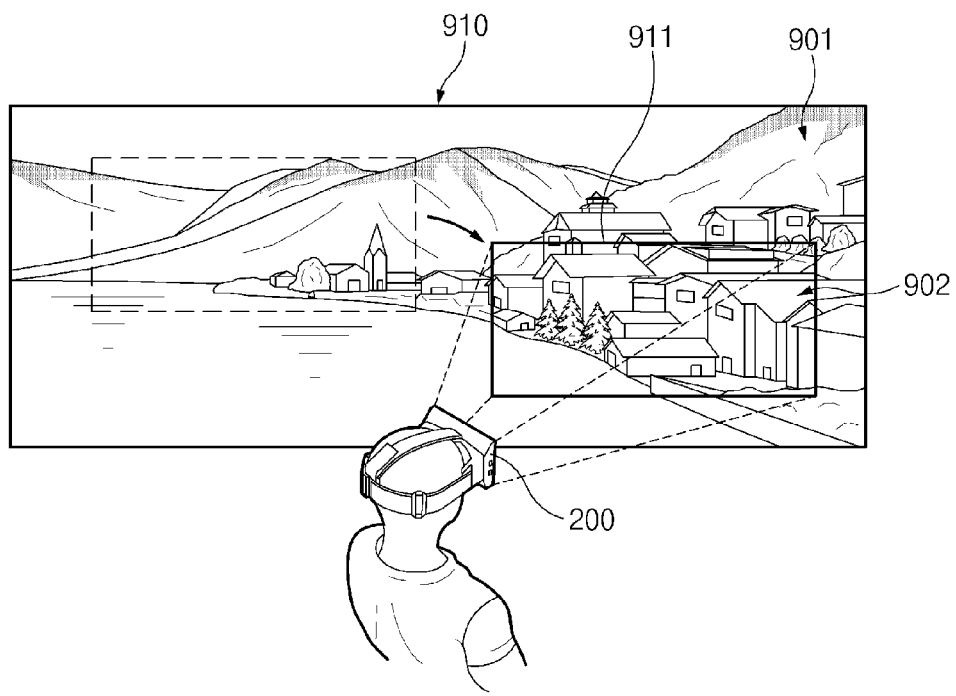
FIG. 9B is a view illustrating a view port movement according to various embodiments of the present disclosure.

FIG. 9B is a view illustrating a viewport movement according to various embodiments of the present disclosure.

Referring to FIG. 9B, the VR management module 170 may move a viewport 911 within the security related contents 910 in correspondence to a movement of the mounting frame 200. According to an embodiment of the present disclosure, the VR management module 170 may move the viewport 911 to include an area where the security related object 902 is disposed in correspondence to the movement. When the viewport 911 stays more than a specified time on the area where the security related object 902 is disposed, the VR management module 170 may obtain corresponding screen information. Alternatively, the VR management module 170 may obtain screen information according to a moving path of the viewport 911. Alternatively, when the position of the viewport 911 is fixed at a specified position of virtual reality contents for more than a specified time or the object 902 is disposed at a specified position within the viewport 911, the VR management module 170 may obtain corresponding screen information or may release an active restriction on access to a resource.

Figure 9C:
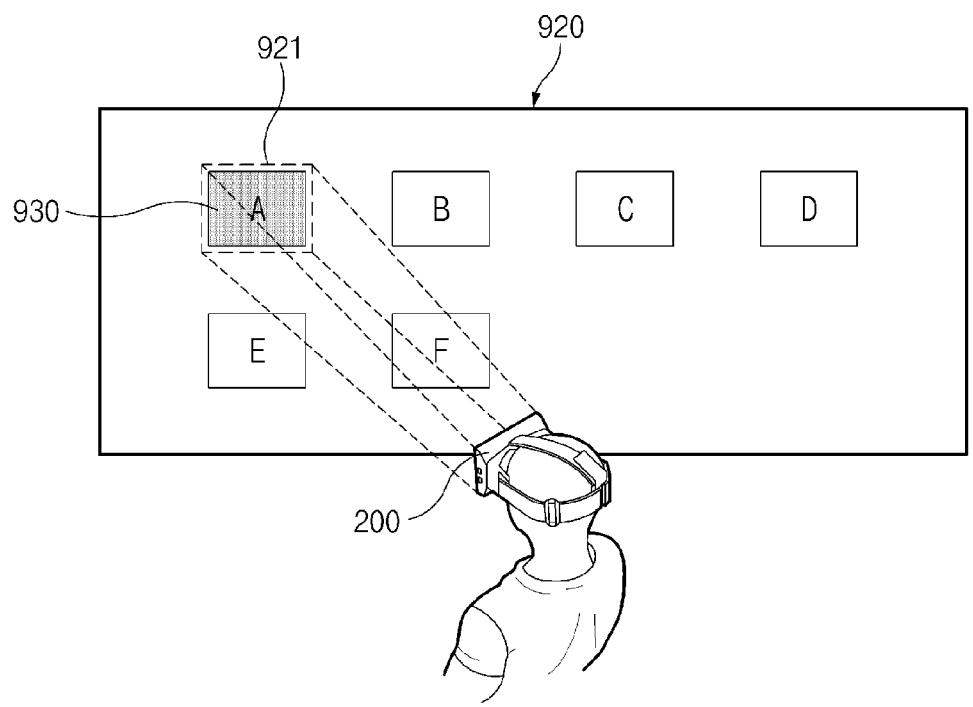
FIG. 9C is a view illustrating a selected security related object execution according to various embodiments of the present disclosure.

FIG. 9C is a view illustrating a selected security related object execution according to various embodiments of the present disclosure.

Referring to FIG. 9C, the VR management module 170 may compare screen information obtained from security related contents 910 with stored security setting information 155. When the information is identical, the VR management module 170 may release an active restriction on access to a resource. For example, the VR management module 170 may stop the output of the security related contents 910 and then may output the virtual reality contents 920. The virtual reality contents 920, for example, may be an image where at least one contents item is disposed. The VR management module 170 may output a viewport 921 on the virtual reality contents 920. The VR management module 170 may move the viewport 921 on the virtual reality contents 920 in correspondence to a movement of the mounting frame 200. According to various embodiments of the present disclosure, the VR management module 170 may dispose the viewport 921 to include the virtual reality object 930 by default. The VR management module 170 may support to search for another virtual reality object by changing the position of the viewport 921 in correspondence to whether the mounting frame 200 moves.

When the viewport 921 is fixed for a specified time or a specified input signal or a specified movement of the mounting frame 200 is received in a state that the virtual reality object 930 is disposed in the viewport 921, the VR management module 170 may execute a function relating to the virtual reality object 930.

Figure 9D:
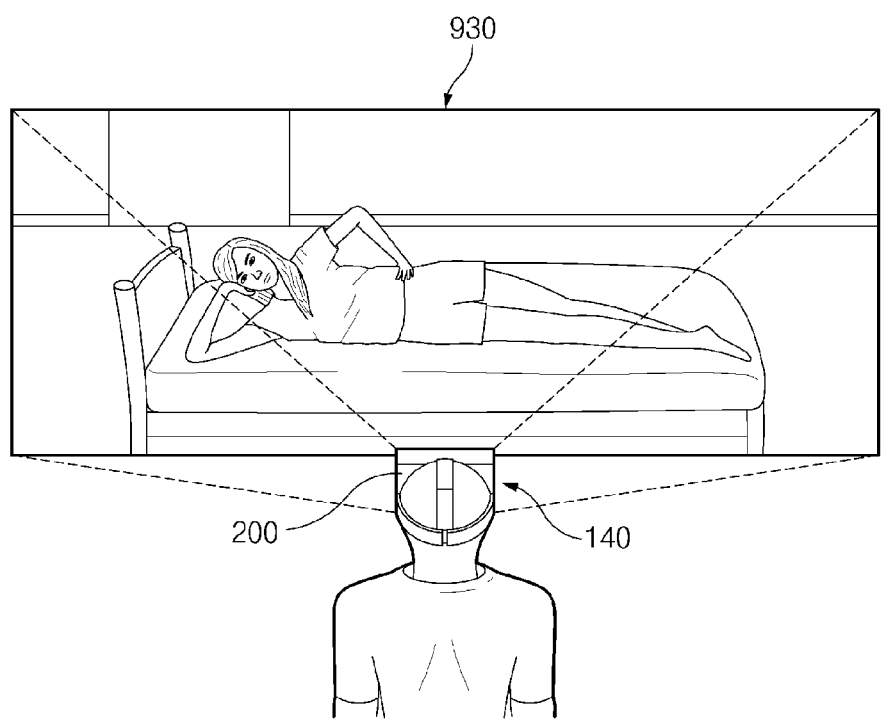
FIG. 9D is a view illustrating a selected virtual reality object execution according to various embodiments of the present disclosure.

FIG. 9D is a view illustrating a selected virtual reality object execution according to various embodiments of the present disclosure.

Referring to FIG. 9D, according to various embodiments of the present disclosure, if the virtual reality object 930 described with reference to FIG. 9C is video contents, the VR management module 170 may output a video playback screen. During this operation, the VR management module 170 may output each image to the divided screens of the display 140 in order to correspond to video viewing through the mounting frame 200. According to various embodiments of the present disclosure, when the virtual reality object 930 is a still image, the VR management module 170 may output a still image to the display 140. During this operation, when the virtual reality object 930 requires a fixed viewport based contents provision like video, the VR management module 170 may output an image having a size identical to the size of the viewport 931. For example, when the screen area of the virtual reality object 930 is larger than the viewport 931, the VR management module 170 may adjust the screen area of the virtual reality object 930 to correspond to the size of the viewport 931 and output the adjusted screen.

Figure 10:
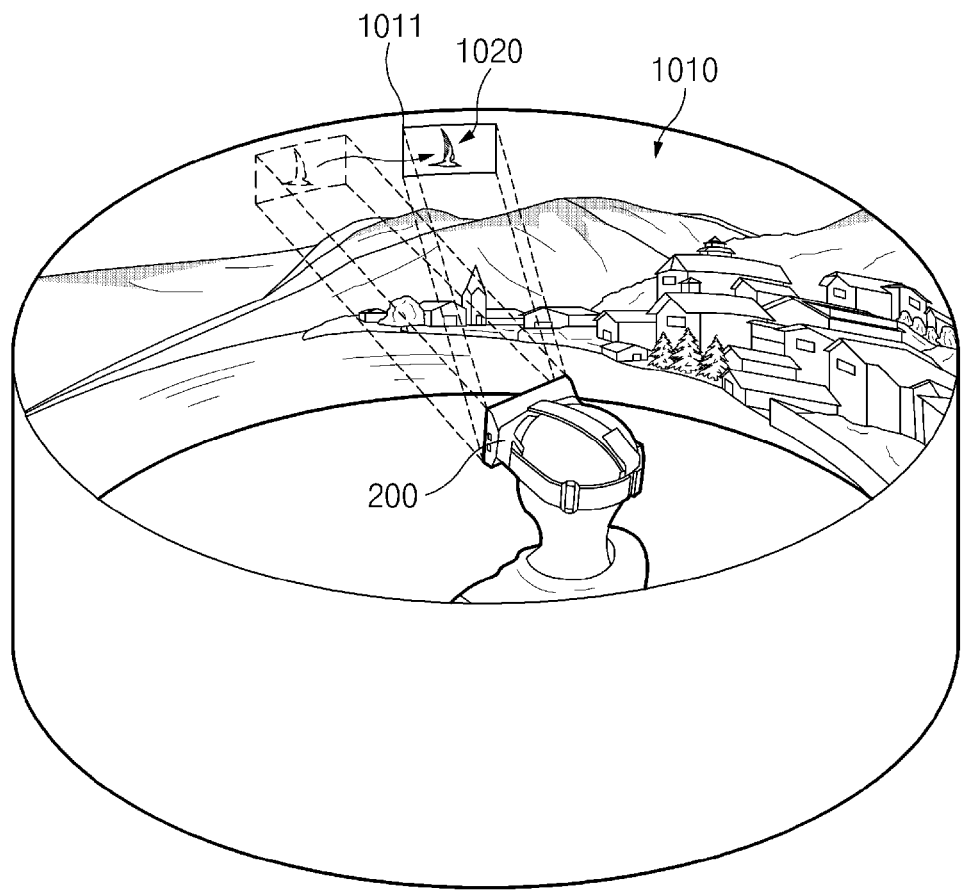
FIG. 10 is a view illustrating a view port movement based restriction release according to various embodiments of the present disclosure.

FIG. 10 is a view illustrating a viewport move based restriction release according to various embodiments of the present disclosure.

Referring to FIG. 10, the VR management module 170 may provide virtual reality contents 1010 including a security related object 1020. The virtual reality contents 1010 may have a larger screen area than a viewport 1011 and may be contents having a cylindrical screen area. When a movement of the mounting frame 200 occurs, the VR management module 170 may move and display the viewport 1011 in the virtual reality contents 1010 in correspondence to a movement of the mounting frame 200.

According to various embodiments of the present disclosure, at least one of objects included in the virtual reality contents 1010 may be an object set to be movable or an object (for example, video contents) having a movement. According to various embodiments of the present disclosure, at least one object included in the virtual reality contents 1010 may be a security related object. For example, a security related object 1020 in the virtual reality contents 1010 may be an object in move.

When a specific sensor signal is collected or a specific input signal is collected in correspondence to a movement of the mounting frame 200, the VR management module 170 may change the position of the viewport 1011. For example, the VR management module 170 may dispose the security related object 1020 to be included in the viewport 1011 in correspondence to a received signal. During this operation, when the security related object 1020 is a moving object, the mounting frame 200 may have a movement in correspondence to a user's motion. The VR management module 170 may move and display the viewport 1011 in correspondence to a movement of the mounting frame 200 and accordingly, the security related object 1020 in move may be included in the viewport 1011. When the security related object 1020 is included in the viewport 1011, the VR management module 170 may obtain screen information. The VR management module 170 may compare the obtained screen information with the security setting information 155. According to an embodiment of the present disclosure, when the security related object 1020 is included in the viewport 1011 for more than a specified time or a moving path of the viewport 1011 includes at least a portion of the security related object 1020 in move for a predetermined time, the VR management module 170 may determine this as a valid restriction release information input. In this case, the VR management module 170 may stop the output of the virtual reality contents 1010 and output virtual reality contents according to set schedule information or a user input. Alternatively, the VR management module 170 may output virtual reality contents including a security related object.

Figure 11A:
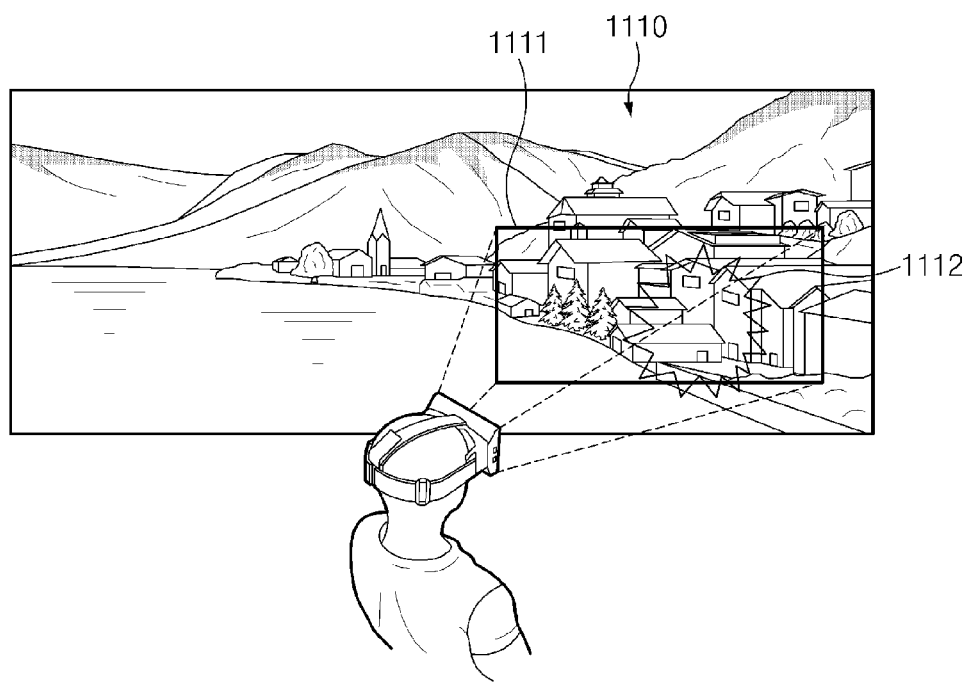
FIG. 11A is a view illustrating a contents output including a security related object according to various embodiments of the present disclosure.

FIG. 11A is a view illustrating a contents output including a security related object according to various embodiments of the present disclosure.

Referring to FIG. 11A, the VR management module 170 may output virtual reality contents 1110 as shown in a state 1110 in correspondence to a virtual reality contents function execution request. The virtual reality contents 1110 may have a broader screen in comparison to the area of the viewport 1111. The virtual reality contents 1110 may include at least one security related object 1112.

The VR management module 170 may move and display the viewport 1111 on the virtual reality contents 1110 in correspondence to a movement of the mounting frame 200 or an input signal. According to an embodiment of the present disclosure, the VR management module 170 may display an area including the security related object 1112 by moving the viewport 1111.

When the viewport 1111 displays an area where the security related object 1112 is disposed for more than a specified time or a specified input signal or sensor signal is collected in a state that the viewport 1111 includes the security related object 1112, the VR management module may perform the comparison of the security setting information 155. For example, the VR management module 170 may mutually compare the security related object 1112 and the security setting information 155 and may determine whether to release an active restriction on access to a resource in correspondence to the comparison result. According to various embodiments of the present disclosure, the VR management module 170 may determine whether a specific object (for example, the security related object 1112) is disposed at a specified position in the viewport 1111 and on the basis of this, may determine whether to release the restriction. In relation to this, an electronic device may store and manage specified position information in relation to restriction release on the specific virtual reality contents 1110 in relation to restriction release. In correspondence to this, the VR management module 170 may extract position information on where the view point 1111 is positioned on the virtual reality contents 1110 and may compare the extracted position information with stored position information to perform a restriction release according to the comparison result.

Figure 11B:
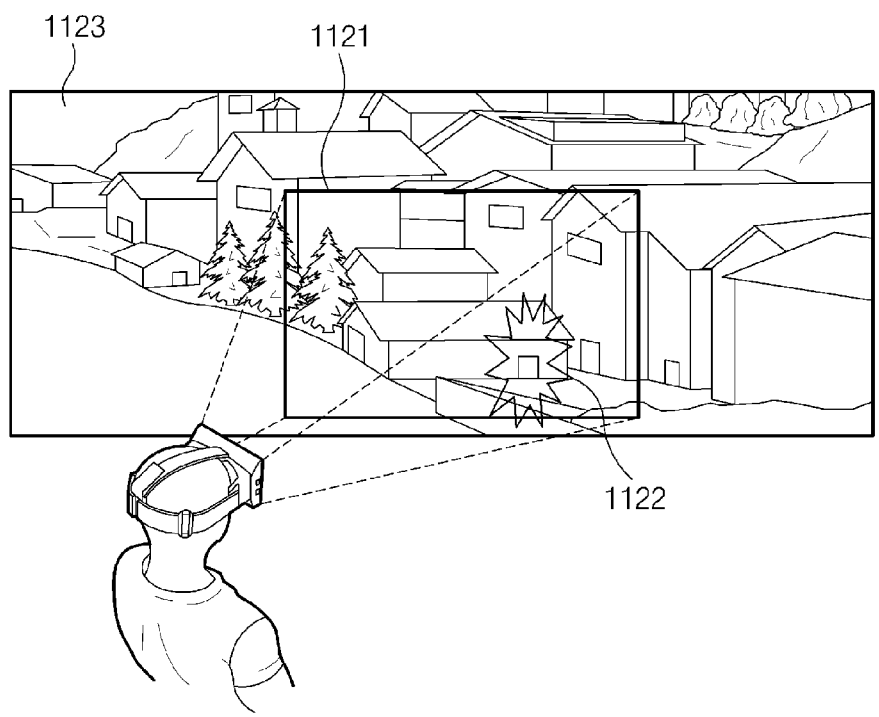
FIG. 11B is a view illustrating a security related object enlargement according to various embodiments of the present disclosure.

FIG. 11B is a view illustrating a security related object enlargement according to various embodiments of the present disclosure.

Referring to FIG. 11B, according to various embodiments of the present disclosure, when the viewport 1111 displays an area including a security related object 1112 for a specified time or a specified input is received, the VR management module 170 may enlarge and display a predetermined area including the security related object 1112. During this operation, the VR management module 170 may enlarge an area relating to the security related object 1112 to be larger than the viewport 1111 and then may display the enlarged area. Alternatively, the VR management module 170 may enlarge an area relating to the security related object 1112 to correspond to the viewport 1111 and then may display the enlarged area.

While the area relating to the security related object 1112 is enlarged larger than the viewport 1111, the security related object 1122 may be included in the viewport 1111 and displayed. When the security related object 1122 is included in the viewport 1111 for more than a specified time, the VR management module 170 may release an active restriction on access to a resource.

Figure 11C:
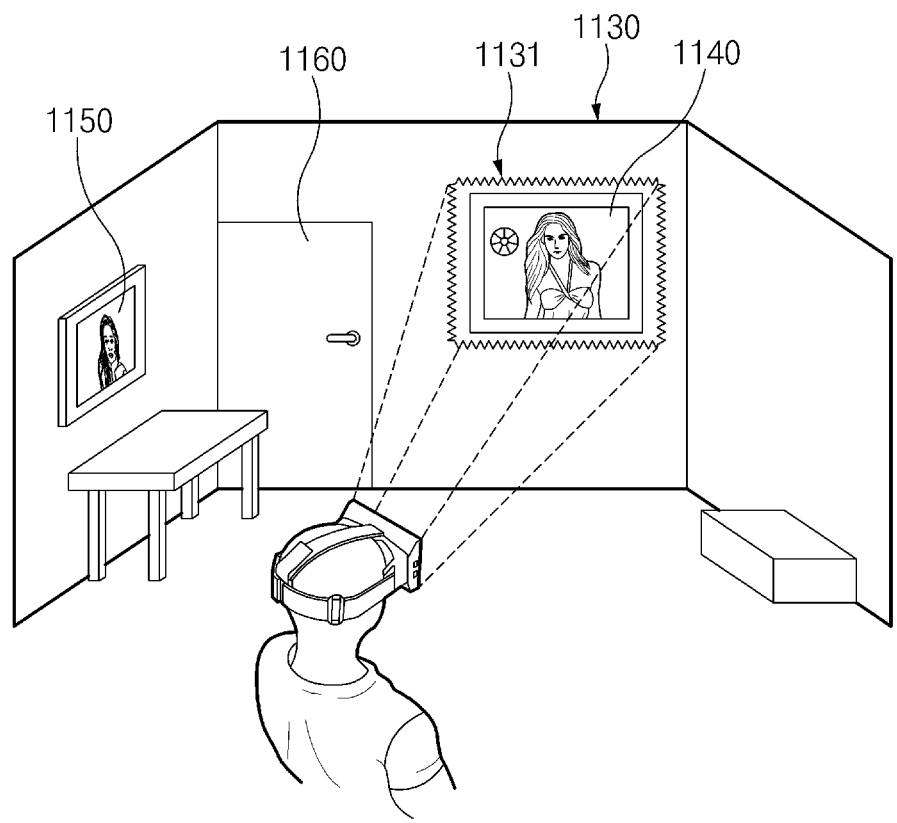
FIG. 11C is a view illustrating an object related function execution of an enlarged security related object according to various embodiments of the present disclosure.

FIG. 11C is a view illustrating an object related function execution of an enlarged security related object according to various embodiments of the present disclosure.

Referring to FIG. 11C, according to various embodiments of the present disclosure, when an event relating to the selection of a security related object 1122 occurs as shown in FIG. 11B, the VR management module 170 may output virtual reality contents relating to the security related object 1122.

According to various embodiments of the present disclosure, while the security related object 1112 is enlarged to correspond to the viewport 1111, if an event for selecting the security related object 1122 occurs by using a view pointer, the VR management module 170 may perform a function relating to the security related object 1122. For example, the VR management module 170 may output the virtual reality contents 1130 linked to the security related object 1122.

The virtual reality contents 1130 may have a broader screen in comparison to the viewport 1131. The virtual reality contents 1130 may include at least one object. For example, the object 1140 may be a security related object. When an event (for example, when indicating the object 1140 by using a view pointer or a viewport including the object 1140 is maintained for more than a specified time) for selecting the object 1140 occurs, the VR management module 170 may output security related contents. For example, the VR management module 170 may output the security related contents described with reference to FIGS. 7A to 8B. According to various embodiments of the present disclosure, the object 1150 may be an object without security setting. If the object 1150 is selected, the VR management module 170 may execute a related function, for example, a gallery function.

According to various embodiments of the present disclosure, the object 1160 may be an object relating to a depth change. When the object 1160 is selected, the VR management module 170 may move (for example, step or depth move) the object 1160 to previous state, for example, a state of FIG. 11B, and display the moved object 1160. Although not shown in the drawing, in FIG. 11B, the VR management module 170 may display an object set to be moved to a state of FIG. 11C, that is, a previous state.

Figure 12:
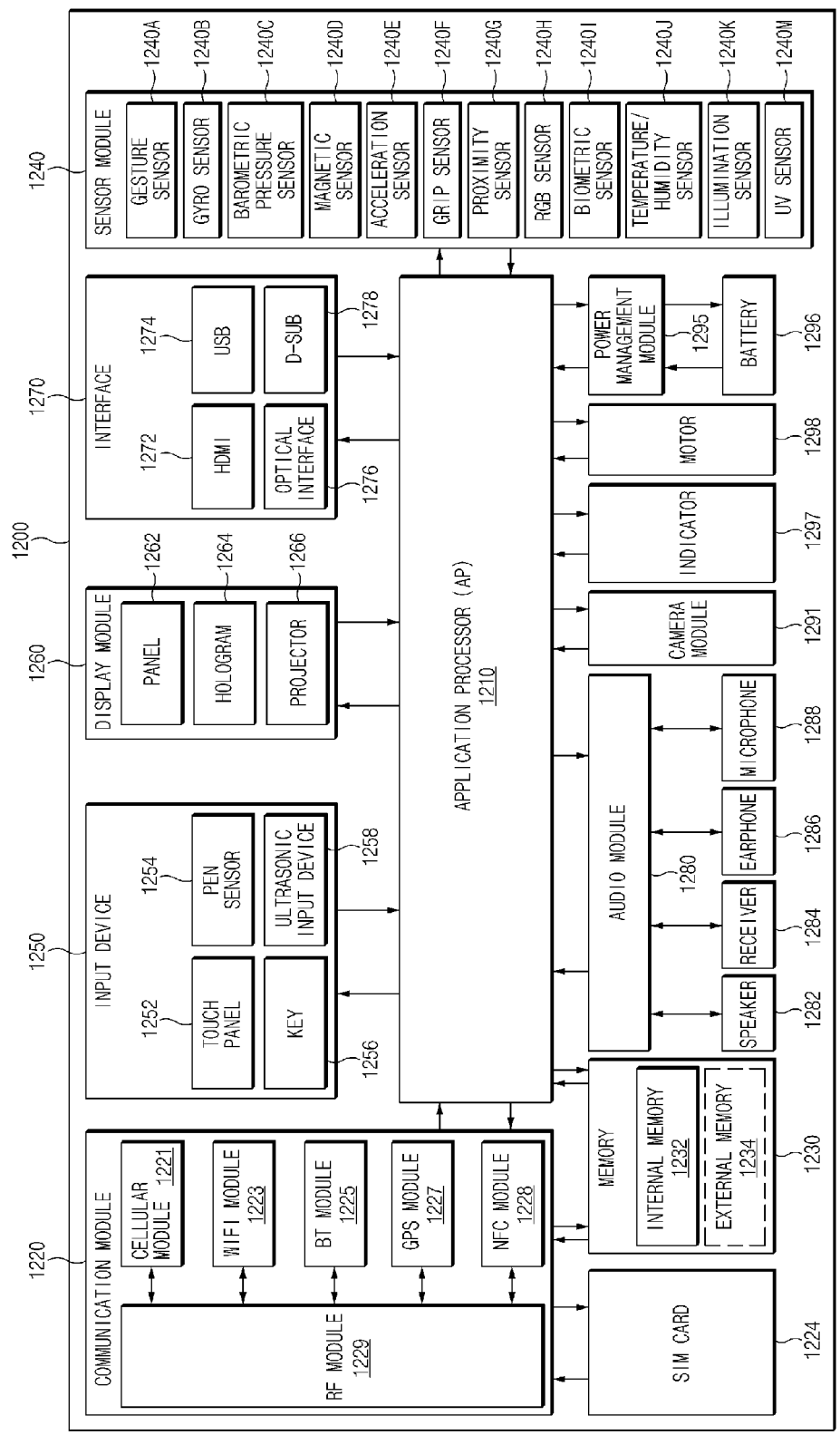
FIG. 12 is a block diagram of an electronic device according to various embodiments of the present disclosure.

FIG. 12 is a block diagram of an electronic device according to various embodiments of the present disclosure.

Referring to FIG. 12, the electronic device 1200, for example, may configure all or part of the above-mentioned electronic device 100 shown in FIG. 1. Referring to FIG. 12, the electronic device 1200 includes at least one application processor (AP) 1210 (for example, the processor 160 and the VR management module 170), a communication module 1220 (for example, the communication interface 110 and the communication module 210), a subscriber identification module (SIM) card 1224, a memory 1230 (for example, the memory 150), a sensor module 1240 (for example, the sensor module 180 and the sensor module 280), an input device 1250 (for example, the input device 300 and the input device 220), a display 1260 (for example, the displays 140), an interface 1270 and an audio module 1280 (for example, the input/output interface 120), a camera module 1291, a power management module 1295, a battery 1296, an indicator 1297, and a motor 1298.

The AP 1210 may include any suitable type of processing circuitry, such as one or more of a general-purpose processor (e.g., an ARM based processor), a Field-Programmable Gate Array (FPGA), an Application-Specific Integrated Circuit (ASIC), or a Digital Signal Processor (DSP). The AP 1210 may control a plurality of hardware or software components connected to the AP 1210 and also may perform various data processing and operations with multimedia data by executing an operating system or an application program. The AP 1210 may be implemented with a system on chip (SoC), for example. According to an embodiment of the present disclosure, the AP 1210 may further include a graphic processing unit (GPU) (not shown).

According to an embodiment of the present disclosure, various modules relating to a function of outputting the above-mentioned virtual reality contents or security related contents may be implemented in the AP 1210. The AP 1210 may check an output condition of security related contents or virtual reality contents by performing a control of related modules and may control the output processing and restriction release of security related contents, virtual reality contents, or virtual reality contents including a security related object according to the output condition.

According to an embodiment of the present disclosure, various modules relating to virtual reality based security related contents output may be separately disposed in at least one of a communication processor (CP) and an AP. During this process, it is configured in terms of hardware that modules controlled by a CP may be disposed to be allowed for direct communication in the same chipset as the CP or to be connected to the CP through an external interface.

According to an embodiment of the present disclosure, various modules relating to virtual reality based security related contents or virtual reality contents output processing may be disposed in the CP. The CP may perform a control on related modules. In this case, the CP may be connected to WiFi, a sensor hub, and a GPS module may be connected to be allowed for direct communication each other. In relation to this, each of components is connected in the same chipset through a system bus so that when an AP is in a power saving mode, they are connected to be communicable with each other. When each of components is configured with a different chipset, it is configured in terms of hardware that they are connected through an external interface so that direction communication is possible without passing through an AP.

The communication module 1220 may perform data transmission/reception through a communication between other electronic devices (for example, the electronic device 104 and the server device 106) connected to the electronic device 1200 (for example, the electronic device 100) via a network. The communication module 1220 may establish a communication channel with the server device 106 and may receive related contents from the server device 106. According to an embodiment, the communication module 1220 may establish a communication channel with an external device (for example, the electronic device 104, the mounting frame 200, and the input device 300). The communication module 1220 may receive at least one of a sensor signal and an input signal and restriction release information from an external device. According to an embodiment of the present disclosure, the communication module 1220 may include a cellular module 1221, a WiFi module 1223, a BT module 1225, a GPS module 1227, an NFC module 1228, and a radio frequency (RF) module 1229.

The cellular module 1221 may provide voice calls, video calls, text services, or internet services through a communication network (for example, LTE, LTE-A, CDMA, WCDMA, UMTS, WiBro, or GSM). The cellular module 1221 may perform a distinction and authentication operation on an electronic device in a communication network by using a subscriber identification module (for example, the SIM card 1224), for example. According to an embodiment of the present disclosure, the cellular module 1221 may perform at least part of a function that the AP 1210 provides. For example, the cellular module 1221 may perform at least part of a multimedia control function.

According to an embodiment of the present disclosure, the cellular module 1221 may further include a communication processor (CP). According to an embodiment, the cellular module 1221 may be implemented with SoC, for example. As shown in FIG. 12, components such as the cellular module 1221 (for example, a CP), the memory 1230, or the power management module 1295 are separated from the AP 1210, but according to an embodiment of the present disclosure, the AP 1210 may be implemented including some of the above-mentioned components (for example, the cellular module 1221).

According to an embodiment of the present disclosure, the AP 1210 or the cellular module 1221 (for example, a CP) may load instructions or data, which are received from a nonvolatile memory or at least one of other components connected thereto, into a volatile memory and then may process them. Furthermore, the AP 1210 or the cellular module 1221 may store data received from or generated by at least one of other components in a nonvolatile memory.

According to various embodiments of the present disclosure, when the cellular module 1221 may receive security related contents from the electronic device 104 or the server device 106. According to an embodiment, the cellular module 1221 may receive restriction release information from the electronic device 104. The cellular module 1221 may deliver to the electronic device 104 a feedback on whether to set or release security in correspondence to the restriction release information.

Each of the WiFi module 1223, the BT module 1225, the GPS module 1227, and the NFC module 1228 may include a processor for processing data transmitted/received through a corresponding module. The WiFi module 1223 and the BT module 1225 may be included in at least one of the communication interface 110 and the communication module 210. The GPS module 1227 may be included in the communication interface 110.

Although the cellular module 1221, the WiFi module 1223, the BT module 1225, the GPS module 1227, and the NFC module 1228 are shown as separate blocks in FIG. 12, according to an embodiment of the present disclosure, some (for example, at least two) of the cellular module 1221, the WiFi module 1223, the BT module 1225, the GPS module 1227, and the NFC module 1228 may be included in one integrated chip (IC) or an IC package. For example, at least some (for example, a CP corresponding to the cellular module 1221 and a WiFi processor corresponding to the WiFi module 1223) of processors respectively corresponding to the cellular module 1221, the WiFi module 1223, the BT module 1225, the GPS module 1227, and the NFC module 1228 may be implemented with one SoC.

According to various embodiments of the present disclosure, the WiFi module 1223 may be included in at least one of the communication interface 110 and the communication module 210 described with reference to FIG. 1. The WiFi module 1223 may establish a direct communication channel with an external device (for example, the input device 300 and the mounting frame 200). The WiFi module 1223 may receive an input signal provided by the input device 300. The WiFi module 1223 may receive at least one of a sensor signal and an input signal provided by the mounting frame 200.

The RF module 1229 may be responsible for data transmission/reception, for example, the transmission/reception of an RF signal. Although not shown in the drawings, the RF module 1229 may include a transceiver, a power amp module (PAM), a frequency filter, or a low noise amplifier (LNA). According to an embodiment, the RF module 1229 may further include components for transmitting/receiving electromagnetic waves on a free space in a wireless communication, for example, conductors or conducting wires. Although the cellular module 1221, the WiFi module 1223, the BT module 1225, the GPS module 1227, and the NFC module 1228 share one RF module 1229 shown in FIG. 12, according to an embodiment of the present disclosure, at least one of the cellular module 1221, the WiFi module 1223, the BT module 1225, the GPS module 1227, and the NFC module 1228 may perform the transmission/reception of an RF signal through an additional RF module.

The SIM card 1224 may be a card including a subscriber identification module and may be inserted into a slot formed at a specific position of an electronic device. The SIM card 1224 may include unique identification information (for example, an integrated circuit card identifier (ICCID)) or subscriber information (for example, an international mobile subscriber identity (IMSI)). According to various embodiments of the present disclosure, the memory 1224 may be part of the configuration of the memory device 120. When the SIM card 1224 is inserted to a slot, the AP 1210 may perform an initialization process of the SIM card 1224.

The memory 1230 (for example, the memory 150) may include an internal memory 1232 or an external memory 1234. The internal memory 1232 may include at least one of a volatile memory (for example, dynamic RAM (DRAM), static RAM (SRAM), synchronous dynamic RAM (SDRAM)) and a non-volatile memory (for example, one time programmable ROM (OTPROM), programmable ROM (PROM), erasable and programmable ROM (EPROM), electrically erasable and programmable ROM (EEPROM), mask ROM, flash ROM, NAND flash memory, and NOR flash memory). According to an embodiment of the present invention, the internal memory 1232 may be a Solid State Drive (SSD).

The external memory 1234 may further include flash drive, for example, compact flash (CF), secure digital (SD), micro Micro-SD, Mini-SD, extreme digital (xD), or a memory stick. The external memory 1234 may be functionally connected to the electronic device 1200 through various interfaces. According to an embodiment of the present invention, the electronic device 1200 may further include a storage device (or a storage medium) such as a hard drive. According to various embodiments of the present disclosure, the memory 1230 may store at least one of security related contents, virtual reality contents including a security related object, and virtual reality contents. The memory 1230 may store security setting information.

The sensor module 1240 (for example, the sensor module 180 and the sensor module 280) measures physical quantities or detects an operating state of the electronic device 1200, thereby converting the measured or detected information into electrical signals. The sensor module 1240 may include at least one of a gesture sensor 1240A, a gyro sensor 1240B, a barometric pressure sensor 1240C, a magnetic sensor 1240D, an acceleration sensor 1240E, a grip sensor 1240F, a proximity sensor 1240G, a color sensor 1240H (for example, a red, green, blue (RGB) sensor), a biometric sensor 1240I, a temperature/humidity sensor 1240J, an illumination sensor 1240K, and an ultra violet (UV) sensor 1240M. According to an embodiment, the sensor module 1240 may include an E-nose sensor (not shown), an electromyography (EMG) sensor, an electroencephalogram (EEG) sensor (not shown), an electrocardiogram (ECG) sensor (not shown), an infra red (IR) sensor (not shown), an iris sensor (not shown), or a fingerprint sensor (not shown). The sensor module 1240 may further include a control circuit for controlling at least one sensor therein.

According to various embodiments of the present disclosure, the sensor module 1240 may collect sensor signals relating to operations of the electronic device 1200. The sensor signals collected by the sensor module 1240 may be delivered to the AP 1210. The AP 1210 may detect a movement of the mounting frame 200 on the basis of the delivered sensor signals. The AP 1210 may move and display at least one of a viewport and a view pointer on outputted contents in correspondence to a movement of the mounting frame 200.

The input device 1250 (for example, the input device 300, the input device 220, and the input/output interface 120) may include a touch panel 1252, a (digital) pen sensor 1254, a key 1256, or an ultrasonic input device 1258.

The touch panel 1252 may recognize a touch input through at least one of capacitive, resistive, infrared, or ultrasonic methods, for example. According to an embodiment, the touch panel 1252 may further include a control circuit. In the case of the capacitive method, both direct touch and proximity recognition are possible. The touch panel 1252 may further include a tactile layer. In this case, the touch panel 1252 may provide a tactile response to a user.

The (digital) pen sensor 1254 may be implemented through a method similar or identical to that of receiving a user's touch input or an additional sheet for recognition. The key 1256 may include a physical button, an optical key, or a keypad, for example. The ultrasonic input device 1258, as a device checking data by detecting sound waves through a microphone (for example, a microphone 1288) in the electronic device 1200, may provide wireless recognition through an input tool generating ultrasonic signals. According to an embodiment of the present disclosure, the electronic device 1200 may receive a user input from an external device (for example, a computer or a server) connected to the electronic device 900 through the communication module 1220.

The display 1260 (for example, the display 140) may include a panel 1262, a hologram device 1264, or a projector 1266. The panel 1262 may include a liquid-crystal display (LCD) or an active-matrix organic light-emitting diode (AM-OLED). The panel 1262 may be implemented to be flexible, transparent, or wearable, for example. The panel 1262 and the touch panel 1252 may be configured with one module. The hologram 1264 may show three-dimensional images in the air by using the interference of light. The projector 1266 may display an image by projecting light on a screen. The screen, for example, may be placed inside or outside the electronic device 1200. According to an embodiment of the present disclosure, the display 1260 may further include a control circuit for controlling the panel 1262, the hologram device 1264, or the projector 1266. According to various embodiments of the present disclosure, the display 1260 may be divided into two screen areas and the same image may be outputted to each area simultaneously or with a time difference.

The interface 1270 may include a high-definition multimedia interface (HDMI) 1272, a universal serial bus (USB) 1274, an optical interface 1276, or a D-subminiature (sub) 1278, for example. Additionally/alternately, the interface 1270 may include a mobile high-definition link (MHL) interface, a secure Digital (SD) card/multi-media card (MMC) interface, or an infrared data association (IrDA) standard interface.

The audio module 1280 (for example, the input/output interface 120) may convert sound into electrical signals and convert electrical signals into sounds. The audio module 1280 may process sound information inputted/outputted through a speaker 1282, a receiver 1284, an earphone 1286, or a microphone 1288. According to an embodiment of the present disclosure, the audio module 1280 may support the collection and processing of a voice instruction in relation to security related contents or virtual reality contents output control and restriction release. The voice instruction recognized by the audio module 1280 may be used in a form similar to the above-mentioned input signal. For example, in relation to the above-mentioned input signal, the voice instruction may be used for security setting and restriction release of security related contents According to an embodiment.

The camera module 1291, as a device for capturing a still image and a video, may include at least one image sensor (for example, a front sensor or a rear sensor), a lens (not shown), an image signal processor (ISP) (not shown), or a flash (not shown) (for example, an LED or a xenon lamp). The camera module 1291 may be used for tracing the user's eyes. The trajectory of the user's eyes traced by the camera module 1291 may be used for the above-mentioned input signal According to an embodiment. For example, eye trajectory information may be used for security setting or set restriction release of security related contents.

The power management module 1295 may manage the power of the electronic device 1200. According to an embodiment of the present disclosure, the power management module 1295 may control the power supply of at least one device element of the electronic device 1200. For example, when a battery power of the electronic device 1200 is less than a setting value, the power management module 1295 may cut off the power supply of specific device elements (for example, the sensor module 190, a communication module, and a GPS module). Although not shown in the drawings, the power management module 1295 may include a power management IC (PMIC), a charger IC, or a battery or fuel gauge, for example.

The PMIC may be built in an IC or SoC semiconductor, for example. A charging method may be classified into a wired method and a wireless method. The charger IC may charge a battery and may prevent overvoltage or overcurrent flow from a charger. According to an embodiment of the present disclosure, the charger IC may include a charger IC for at least one of a wired charging method and a wireless charging method. As the wireless charging method, for example, there is a magnetic resonance method, a magnetic induction method, or an electromagnetic method. An additional circuit for wireless charging, for example, a circuit such as a coil loop, a resonant circuit, or a rectifier circuit, may be added.

The battery gauge may measure the remaining amount of the battery 1296, or a voltage, current, or temperature of the battery 1296 during charging. The battery 1296 may store or generate electricity and may supply power to the electronic device 1200 by using the stored or generated electricity. The battery 1296, for example, may include a rechargeable battery or a solar battery.

The indicator 1297 may display a specific state of the electronic device 1200 or part thereof (for example, the AP 1210), for example, a booting state, a message state, or a charging state. According to an embodiment of the present disclosure, the indicator 1297 may display an indicator relating to a security related contents output state and a virtual reality contents output state. The motor 1298 may convert electrical signals into mechanical vibration. Although not shown in the drawings, the electronic device 1200 may include a processing device (for example, a GPU) for mobile TV support. A processing device for mobile TV support may process media data according to the standards such as digital multimedia broadcasting (DMB), digital video broadcasting (DVB), or media flow.

Each of the above-mentioned components of the electronic device according to various embodiments of the present disclosure may be configured with at least one component and the name of a corresponding component may vary according to the kind of an electronic device. An electronic device according to various embodiments of the present disclosure may include at least one of the above-mentioned components, may not include some of the above-mentioned components, or may further include another component. Additionally, some of components in an electronic device according to various embodiments of the present disclosure are configured as one entity, so that functions of previous corresponding components are performed identically.

The term "module" used in various embodiments of the present disclosure, for example, may mean a unit including a combination of at least one of hardware, software, and firmware. The term "module" and the term "unit", "logic", "logical block", "component", or "circuit" may be interchangeably used. A "module" may be a minimum unit or part of an integrally configured component. A "module" may be a minimum unit performing at least one function or part thereof. A "module" may be implemented mechanically or electronically. For example, "module" according to various embodiments of the present disclosure may include at least one of an application-specific integrated circuit (ASIC) chip performing certain operations, field-programmable gate arrays (FPGAs), or a programmable-logic device, all of which are known or to be developed in the future.

According to various embodiments of the present disclosure, at least part of a device (for example, modules or functions thereof) or a method (for example, operations) according to this disclosure, for example, as in a form of a programming module, may be implemented using an instruction stored in computer-readable storage media. When at least one processor (for example, the processor 160) executes an instruction, it may perform a function corresponding to the instruction. The non-transitory computer-readable storage media may include the memory 150, for example. At least part of a programming module may be implemented (for example, executed) by the processor 120, for example. At least part of a programming module may include a module, a program, a routine, sets of instructions, or a process to perform at least one function, for example.

The computer-readable storage media may include Magnetic Media such as a hard disk, a floppy disk, and a magnetic tape, Optical Media such as Compact Disc Read Only Memory (CD-ROM) and Digital Versatile Disc (DVD), Magneto-Optical Media such as Floptical Disk, and a hardware device especially configured to store and perform a program instruction (for example, a programming module) such as Read Only Memory (ROM), Random Access Memory (RAM), and flash memory. Additionally, a program instruction may include high-level language code executable by a computer using an interpreter in addition to machine code created by a complier. The hardware device may be configured to operate as at least one software module to perform an operation of various embodiments and vice versa.

A module or a programming module according to various embodiments may include at least one of the above-mentioned components, may not include some of the above-mentioned components, or may further include another component. Operations performed by a module, a programming module, or other components according to various embodiments of the present disclosure may be executed through a sequential, parallel, repetitive or heuristic method. Additionally, some operations may be executed in a different order or may be omitted. Or, other operations may be added.

According to various embodiments of the present disclosure, in relation to a storage medium storing instructions, when the instructions are executed by at least one processor, the at least one processor is set to perform at least one operation and the at least one operation includes displaying security related contents for restriction release, receiving at least one of a sensor signal and an input signal while the security related contents are outputted, collecting an object relating to the security related contents in correspondence to at least one of the received sensor signal and input signal, comparing information relating to the object and specified security setting information, and determining whether to release a restriction on access to a resource in correspondence to the comparison result.

As mentioned above, in relation to a security management method and an electronic device supporting the same in accordance with various embodiments of the present disclosure, the various embodiments may apply a security function relating to contents access to a virtual reality environment or an augmented reality environment.

Moreover, various embodiments of the present disclosure may provide various authentication techniques in a virtual reality environment.

Also, embodiments of the present disclosure disclosed in this specification and drawings are provided as specific examples to describe technical content and help understanding and also do not limit the scope of the present disclosure. Accordingly, it should be construed that besides the embodiments listed herein, all modifications or modified forms derived based on the technical ideas of the present disclosure are included in the scope of the present disclosure.

FIGS. 1-12 are provided as an example only. At least some of the steps discussed with respect to these figures can be performed concurrently, performed in a different order, and/or altogether omitted. It will be understood that the provision of the examples described herein, as well as clauses phrased as "such as," "e.g.", "including", "in some aspects," "in some implementations," and the like should not be interpreted as limiting the claimed subject matter to the specific examples.

The above-described aspects of the present disclosure can be implemented in hardware, firmware or via the execution of software or computer code that can be stored in a recording medium such as a CD-ROM, a Digital Versatile Disc (DVD), a magnetic tape, a RAM, a floppy disk, a hard disk, or a magneto-optical disk or computer code downloaded over a network originally stored on a remote recording medium or a non-transitory machine-readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for".

While the present disclosure has been particularly shown and described with reference to the examples provided therein, it will be understood by those skilled in the art that various changes in form and details may be made therein without departing from the spirit and scope of the present disclosure as defined by the appended claims.

What is claimed is:
1. A method comprising:
   detecting, by an electronic device, at least one signal that is generated while a predetermined content is displayed on a display;
   identifying a security-related object associated with the content based on the signal;
   enlarging a specific area including the security-related object when a viewport displaying at least a portion of the content displays an area including the security-related object for a specified time or a specified input is received;

comparing, by the electronic device, information relating to the enlarged security-related object with specified security setting information; and releasing a restriction for a first authentication on access to a resource based on an outcome of the comparison, wherein the signal comprises at least one of a sensor signal relating to a movement of at least one of the electronic device and a mounting frame where the electronic device is mounted, wherein the sensor signal applies for releasing the restriction, wherein releasing the restriction comprises outputting virtual reality content corresponding to set information or a user input detected corresponding to the restriction release, wherein the viewport corresponds to a direction of the mounting frame where the electronic device is mounted, and wherein the predetermined content comprises a continuous virtual domain and wherein the security-related object is located outside the viewport and traversing over the continuous virtual domain responsive to the sensor signal until the security-related object is located in the viewport.

2. The method of claim 1, wherein the security-related object is identified based on a location of a view pointer in the viewport.

3. The method of claim 1, wherein the security-related object is identified based on at least one of a location of a view pointer and a location of the viewport within the content.

4. The method of claim 1, further comprising at least one of:

when a first specified input signal is detected, initiating a collection of security-related information; and when a second specified input signal is detected, terminating the collection of the security-related information collection, wherein the restriction is released based on the security-related information.

5. The method of claim 1, wherein identifying the object comprises:

selecting a base object from the content; and modifying the base object based on the signal to generate the security-related object.

6. An electronic device comprising:

a display configured to output a predetermined content; and a processor configured to:

identify a security-related object that is associated with the content based on signal that is generated while the content is on display, enlarge a specific area including the security-related object when a viewport displaying at least a portion of the content displays an area including the security-related object for a specified time or a specified input is received, compare information relating to the enlarged security-related object with specified security setting information, and release a restriction for a first authentication on access to a resource based on an outcome of the comparison, wherein the signal comprises at least one of a sensor signal relating to a movement of at least one of the electronic device and a mounting frame where the electronic device is mounted, wherein the sensor signal applies for releasing the restriction, wherein the viewport corresponds to a direction of the mounting frame where the electronic device is mounted, and wherein the predetermined content comprises a continuous virtual domain and wherein the security-related object is located outside the viewport and wherein the processor is configured to traverse over the continuous virtual domain responsive to the sensor signal until the security-related object is located in the viewport.

7. The electronic device of claim 6, wherein the security related object is identified based on a location of a view pointer and a specified input signal.

8. The electronic device of claim 6, wherein the processor is further configured to initialize a collection of security related information or terminate the collection of the security related information when a specified input signal is detected.

9. The electronic device of claim 6, wherein the security-related object is identified based on at least one of a location of a view pointer and a location of the viewport within the content.

10. The electronic device of claim 6, wherein the processor is further configured to detect a selection of at least one base object included from the content and modifying the at least one base object based on the signal to generate the security-related object in order to identify the security-related object.

11. The electronic device of claim 6, wherein the security related object is selected based on a movement relative to a moving object included in the content.

12. The method of claim 1, further comprising outputting virtual reality contents linked to the security related object while the security related object is enlarged to correspond to the viewport, if an event for selecting the security related object occurs.

13. The electronic device of claim 6, wherein the processor is further configured to output virtual reality contents linked to the security related object while the security related object is enlarged to correspond to the viewport, if an event for selecting the security related object occurs.

* * * * *